United States Patent
Kleinau et al.

(10) Patent No.: US 6,900,607 B2
(45) Date of Patent: May 31, 2005

(54) COMBINED FEEDFORWARD AND FEEDBACK PARAMETER ESTIMATION FOR ELECTRIC MACHINES

(75) Inventors: Julie A. Kleinau, Bay City, MI (US); Steven J. Collier-Hallman, Frankenmuth, MI (US); Ashok Chandy, Fenton, MI (US); Ravindra P. Patankar, Chassell, MI (US); Daniel W. Shafer, Flushing, MI (US); Jeffery A. Zuraski, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 420 days.

(21) Appl. No.: 10/013,933

(22) Filed: Dec. 11, 2001

(65) Prior Publication Data

US 2003/0076061 A1 Apr. 24, 2003

Related U.S. Application Data

(60) Provisional application No. 60/313,302, filed on Aug. 17, 2001.

(51) Int. Cl.[7] .............................. H02P 7/00; H02H 5/04; B62D 11/06; B62D 6/00
(52) U.S. Cl. ....................... 318/432; 318/783; 318/472; 388/934; 180/446; 701/42
(58) Field of Search ................................ 318/432, 783, 318/788, 791, 792, 798, 806, 433, 434, 471, 472, 473; 180/443, 446; 388/934; 322/33, 34; 337/298

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |

(Continued)

FOREIGN PATENT DOCUMENTS

| | | |
|---|---|---|
| EP | 0 808 029 A2 | 11/1997 |
| EP | 0 821 468 A2 | 1/1998 |

(Continued)

OTHER PUBLICATIONS

Berendsen, Carsten–Sunnke; Champenois, Gerard; and Bolopion Alain; "Commutation Strategies For Brushless DC Motors: Influence on Instant Torque", Apr. 1993, *IEEE Transactions On Power Electronics*, vol. 8 No. 2; pp. 231–236.

Blaubjer, Frede; Pedersen, John K.; Jaeger, Ulrik; and Paul Thoegerson; "Single Current Sensor Technique In the DC Link of Three–Phase PWM–VS Inverters: A Review and a Novel Solution", Sep./Oct. 1997, *IEEE Transactions On Industry Applications*, vol. 33 No. 5; pp. 1241–1249.

(Continued)

*Primary Examiner*—Shih-Yung Hsieh
*Assistant Examiner*—Edgardo San Martin
(74) *Attorney, Agent, or Firm*—Michael D. Smith

(57) ABSTRACT

A method and system for estimating a parameter of an electric machine, including a controller and a switching device, the controller responsive to at least one of: a current sensor, and a temperature sensor. Where the controller executes a parameter estimation process, which is responsive to at least one of: a current value, a torque command and the resultant of the parameter estimation process representing an estimated parameter of the electric machine. The parameter estimation includes a method for estimating a temperature of the electric machine comprising: a temperature sensor operatively connected to and transmitting a temperature signal corresponding to a measured temperature to a controller, which executes a temperature estimation process responsive to a temperature signal from a temperature sensor.

181 Claims, 10 Drawing Sheets

U.S. PATENT DOCUMENTS

| | | | |
|---|---|---|---|
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kühnlein | 318/254 |
| 4,447,771 A | 5/1984 | Whited | 18/661 |
| 4,511,827 A | 4/1985 | Morinaga et al. | 318/254 |
| 4,556,811 A | 12/1985 | Hendricks | 310/266 |
| 4,558,265 A | 12/1985 | Hayashida et al. | 318/561 |
| 4,633,157 A | 12/1986 | Streater | 318/723 |
| 4,688,655 A | 8/1987 | Shimizu | 180/79.1 |
| 4,721,894 A * | 1/1988 | Graber | 318/473 |
| 4,745,984 A | 5/1988 | Shimizu | 180/79.1 |
| 4,771,845 A | 9/1988 | Shimizu | |
| 4,789,040 A * | 12/1988 | Morishita et al. | 180/446 |
| 4,805,126 A | 2/1989 | Rodems | |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 4,912,379 A | 3/1990 | Matsuda et al. | 318/254 |
| 4,992,717 A | 2/1991 | Marwin et al. | 318/696 |
| 5,006,774 A | 4/1991 | Rees | 318/721 |
| 5,040,629 A | 8/1991 | Matsuoka et al. | 180/79.1 |
| 5,063,011 A | 11/1991 | Rutz et al. | 264/126 |
| 5,068,591 A * | 11/1991 | Hoegberg et al. | 322/29 |
| 5,069,972 A | 12/1991 | Versic | 428/407 |
| 5,076,381 A | 12/1991 | Daido et al. | 180/79.1 |
| 5,122,719 A | 6/1992 | Bessenyei et al. | 318/629 |
| 5,223,775 A | 6/1993 | Mongeau | 318/432 |
| 5,238,079 A * | 8/1993 | Gorim | 180/446 |
| 5,239,490 A | 8/1993 | Masaki et al. | 364/565 |
| 5,245,286 A * | 9/1993 | Carlson et al. | 324/319 |
| 5,331,245 A | 7/1994 | Burgbacher et al. | 310/186 |
| 5,349,278 A | 9/1994 | Wedeen | 318/632 |
| 5,361,210 A | 11/1994 | Fu | 364/424.05 |
| 5,428,285 A | 6/1995 | Koyama et al. | 318/799 |
| 5,433,541 A | 7/1995 | Hieda et al. | 400/279 |
| 5,442,268 A | 8/1995 | Goodarzi et al. | |
| 5,444,341 A | 8/1995 | Kneifel, II et al. | 318/432 |
| 5,460,235 A | 10/1995 | Shimizu | 180/79.1 |
| 5,467,275 A | 11/1995 | Takamoto et al. | 364/426.01 |
| 5,469,215 A | 11/1995 | Nashiki | 318/432 |
| 5,475,289 A | 12/1995 | McLaughlin et al. | 318/432 |
| 5,554,913 A | 9/1996 | Ohsawa | 318/434 |
| 5,568,389 A | 10/1996 | McLaughlin et al. | 364/424.05 |
| 5,569,994 A | 10/1996 | Taylor et al. | 318/700 |
| 5,579,188 A | 11/1996 | Dunfield et al. | 360/99.08 |
| 5,585,708 A | 12/1996 | Richardson et al. | 318/800 |
| 5,616,999 A | 4/1997 | Matsumura et al. | 318/632 |
| 5,623,409 A | 4/1997 | Miller | 364/424.051 |
| 5,625,239 A | 4/1997 | Persson et al. | 310/68 B |
| 5,642,044 A | 6/1997 | Weber | 324/207.25 |
| 5,656,911 A | 8/1997 | Nakayama et al. | 318/718 |
| 5,668,721 A | 9/1997 | Chandy | 701/41 |
| 5,672,944 A | 9/1997 | Gokhale et al. | 318/254 |
| 5,699,207 A | 12/1997 | Supino et al. | |
| 5,701,065 A | 12/1997 | Ishizaki | 318/701 |
| 5,712,802 A | 1/1998 | Kumar et al. | 364/557 |
| 5,721,479 A | 2/1998 | Kumar et al. | 318/801 |
| 5,777,449 A | 7/1998 | Schlager | 318/459 |
| 5,780,986 A | 7/1998 | Shelton et al. | 318/432 |
| 5,803,197 A | 9/1998 | Hara et al. | 180/248 |
| 5,811,905 A | 9/1998 | Tang | 310/179 |
| 5,811,957 A | 9/1998 | Bose et al. | 318/802 |
| 5,852,355 A | 12/1998 | Turner | 318/701 |
| 5,881,836 A | 3/1999 | Nishimoto et al. | 180/446 |
| 5,898,990 A | 5/1999 | Henry | 29/598 |
| 5,919,241 A | 7/1999 | Bolourchi et al. | 701/41 |
| 5,920,161 A | 7/1999 | Obara et al. | 318/139 |
| 5,929,590 A | 7/1999 | Tang | 318/701 |
| 5,934,398 A | 8/1999 | Hotta | 180/65.8 |
| 5,962,999 A | 10/1999 | Nakamura et al. | 318/432 |
| 5,963,706 A | 10/1999 | Baik | 388/804 |
| 5,967,253 A | 10/1999 | Collier-Hallman | 180/421 |
| 5,977,740 A | 11/1999 | McCann | 318/701 |
| 5,984,042 A | 11/1999 | Nishimoto et al. | 180/446 |
| 5,992,556 A | 11/1999 | Miller | 180/446 |
| 6,002,226 A | 12/1999 | Collier-Hallman et al. | 318/439 |
| 6,002,234 A | 12/1999 | Ohm et al. | 318/729 |
| 6,034,460 A | 3/2000 | Tajima et al. | 310/179 |
| 6,034,493 A | 3/2000 | Boyd et al. | 318/254 |
| 6,043,624 A | 3/2000 | Masaki et al. | 318/723 |
| 6,046,560 A * | 4/2000 | Lu et al. | 318/432 |
| 6,049,182 A | 4/2000 | Nakatani et al. | 318/432 |
| 6,088,661 A * | 7/2000 | Poublon | 702/130 |
| 6,092,618 A | 7/2000 | Collier-Hallman | 180/422 |
| 6,104,150 A | 8/2000 | Oohara et al. | 318/254 |
| 6,121,852 A | 9/2000 | Mizoguchi et al. | |
| 6,129,172 A | 10/2000 | Yoshida et al. | 180/446 |
| 6,188,189 B1 | 2/2001 | Blake | |
| 6,250,419 B1 | 6/2001 | Chabaan et al. | |
| 6,334,503 B1 * | 1/2002 | Fukumura et al. | 180/446 |
| 6,338,016 B1 * | 1/2002 | Miller et al. | 180/446 |
| 6,373,211 B1 | 4/2002 | Henry et al. | 318/432 |
| 6,448,731 B1 * | 9/2002 | Miller et al. | 318/488 |
| 6,453,226 B1 | 9/2002 | Hac et al. | 701/48 |
| 6,520,279 B2 * | 2/2003 | Fukumoto et al. | 180/446 |
| 6,546,324 B1 | 4/2003 | Chen et al. | 701/48 |
| 6,565,064 B2 | 5/2003 | Smith et al. | 251/129.04 |
| 6,567,731 B2 | 5/2003 | Chandy | 701/36 |
| 6,625,530 B1 | 9/2003 | Bolourchi | 701/42 |
| 2003/0071594 A1 | 4/2003 | Kleinau et al. | 318/567 |
| 2003/0076064 A1 | 4/2003 | Kleinau et al. | 318/567 |
| 2003/0076065 A1 | 4/2003 | Shafer et al. | 318/567 |

FOREIGN PATENT DOCUMENTS

| | | | |
|---|---|---|---|
| EP | 0 943 481 A2 | | 9/1999 |
| JP | 09051700 | * | 2/1997 |
| JP | 9-271198 | | 10/1997 |
| JP | 11262241 | * | 9/1999 |
| WO | 01/20751 A2 | | 3/2001 |

OTHER PUBLICATIONS

De La Ree, Jaime; and Latorre, Jaime; "Permanent Magnet Machines Torque Considerstaions," *Conference Record of the IEEE Industry Applications Society Annual Meeting Part I*, IEEE Catalog No. 88CH2565–0, Part 1, Oct. 2–7, 1988; pp. 32–37.

De La Ree, Jaime; and Boules, Nady; "Torque Production In Permanent–Magnet Synchronous Motors", Jan./Feb. 1989, *IEEE Transactions On Industry Applications*, vol. 25 No. 1; pp. 107–112.

Mirkazemi–moud, Mehran; Green, Tim C.; and Williams, Barry W.; "Analysis and Comparison of Real–Time Sine–Wave Generation for PMW Circuits", Jan. 1993, *IEEE Transactions On Power Electronics*, vol. 8, No. 1; pp. 46–54.

Murai, Yoshihiro; Kawase, Yoshihiro; and Ohashi, Karuharu; "Torque Ripple Improvement for Brushless DC Miniature Motors," *Conference Record of the 1987 IEEE Industry Applications Society Annual Meeting Part 1*, IEEE Catalog No. 87CH2499–2, Oct. 18–23, 1987; pp. 21–28.

Parasiliti, Francesco; Petrella, Roberto; and Tursini, Marco; "Low Cost Phase Current Sensing in DSP Based AC Drives," *IEEE Transactions*, pp. 1284–1289.

*Brown Boveri Review*, "Static Frequency Changers with "Subharmonic" Control in Conjunction with Reversible Variable–Speed A.C. Drives," Aug./Sep. 1964, vol. 51 No. 8/9; pp. 555–577.

Asaii, B., et al.; "A Simple High Efficient Torque Control For The Electric Vehicle Induction Machine Drives Without A Shaft Encoder"; Power Electronics Specialists Conference, 1995. PESC '95 Records, 26th Annual IEEE Atlanta, GA, USA Jun. 18–22, 1995, pp. 778–784.

Gotter Gottfried; "Erwarmung and Kühlung elektrischer Maschinin"; Springer Verlag, Berlin 1954; pp. 95–116.

Zoran Lazarevic, et al.; "A Novel Approach For Temperature Estimation In Squirrel–Cage Induction Motor Without Sensors", IEEE Transactions on Instrumentation and Measurement, IEEE Inc. New York, US, vol. 48, No. 3, Jun. 1999, pp. 753–757.

Industry Applications Conference, 1995. Thirtieth IAS Annual Meeting, IAS '95., Conference Record of the 1995 IEEE Orlando, Florida Oct. 8–12, 1995, New York, NY USA, IEEE, US, (pp. 207–215).*

* cited by examiner

| ESTIMATE TEMPERATURE FILTERS | LOW PASS (LAG) FILTER FREQUENCY | LEAD FILTER FREQUENCY | GAIN MIN | MAX |
|---|---|---|---|---|
| SILICON | 53 µHz- 320 µHz | 53 Hz- 160 µHz | 0.5 | 10.0 |
| MAGNET | 35 µHz- 80 µHz | 53 Hz- 160 µHz | 0.5 | 10.0 |
| COPPER WINDING | 35 µHz- 80 µHz | 53 Hz- 160 µHz | 0.5 | 10.0 |

COMBINED FEEDFORWARD AND FEEDBACK PARAMETER ESTIMATION FOR ELECTRIC MACHINES

CROSS-REFERENCE TO RELATED APPLICATIONS

This application claims the benefit of U.S. provisional application No. 60/313,302 filed Aug. 17, 2001 the contents of which are incorporated by reference herein in their entirety.

BACKGROUND

Electric machines, for example, permanent magnet (PM) motors as may be employed in electric power steering systems (EPS) are affected by parameter variations, which impact the overall system performance as a function of temperature, build and changes over life. The motor circuit resistance, R; inductance, L; and the motor torque/voltage constant, $K_e$; are the three primary parameters, which affect motor control and performance. Over normal operating temperatures, the motor circuit resistance, R changes by up to 60 to 70%; the motor inductance, L varies a modest amount; and the motor constant, $K_e$ varies by as much as +/−7%. In addition, both the motor circuit resistance, R and motor constant, $K_e$ exhibit variations of about +/−5% for build and a degradation of approximately 10% over the life of the system. The motor resistance, R increases with life and the motor constant, $K_e$ decreases over life. On the other hand, build variations of the motor parameters tend to be randomly distributed. Therefore, without some form of temperature, build, or duration/life dependent compensation, the variations in motor output torque and system damping will result in decreased performance of the power steering system.

To account for variations in the resistance R only, a resistance estimation methodology was conceived of and described in pending commonly assigned U.S. patent application Ser. No. 60/154,692, by Sayeed Mir et al. While able to correct for variations in resistance R due to temperature, build, and life, and well suited for its intended purposes, the correction scheme disclosed in that invention was not always capable of addressing varied motor operating conditions. For example, such conditions may include, when the motor is at stall, in quadrant II of the torque vs. velocity plane, at low currents, or at high motor velocities. In a vehicle employing an electronic steering system significant time may be spent at stall and low motor currents (highway driving for example), and large changes in temperature may occur during these periods. Most correction schemes are configured to make corrections very slowly, thus, it may require significant time to eliminate such an error. Of further significance, existing design schemes may not account for variation in other motor parameters, such as motor constant, which may vary significantly over temperature, build, and life.

Steering systems currently exist which employ the use of current controlled motors. In order to maintain the desired current levels as the temperature in the system varies, these current controlled motors are typically equipped with current sensors as part of a hardware current loop. However, there are also other motor designs in existence that, for cost purposes, require the use of a voltage mode controlled system. In such a situation, the same methods described above to compensate for temperature in the current controlled motor cannot be applied to the voltage-controlled motor in a cost effective manner. Without the benefit of numerous expensive sensors, it becomes necessary to obtain accurate estimations of motor resistance R, motor constant Ke, and temperature readings for voltage control, which accurately controls motor torque.

SUMMARY OF THE INVENTION

A system for estimating a parameter of an electric machine, comprising: a controller operatively connected to a switching device, which is operatively connected between the electric machine and a power source, the switching device being responsive to the controller; and at least one of: a current sensor operatively connected to and transmitting a current value indicative of a current in the electric machine, and a temperature sensor operatively connected to and transmitting a temperature signal corresponding to a measured temperature to the controller. Where the controller executes a parameter estimation process, which is responsive to at least one of, a current value indicative of a current in the electric machine, a torque command indicative of a desired torque for the electric machine, the temperature value, and a resultant of the parameter estimation process representing an estimated parameter of the electric machine.

A method for estimating a parameter of an electric machine, comprising: receiving at least one of: a torque command signal indicative of a desired torque for the electric machine; a current value; and a temperature value. The parameter estimating is a resultant of a parameter estimation process responsive to one or more of the torque command signal, the current value, and the temperature value.

A storage medium encoded with a machine-readable computer program code for estimating a parameter of an electric machine. The storage medium including instructions for causing controller to implement the method for estimating a parameter of an electric machine as described above.

A computer data signal embodied in a carrier wave for estimating a parameter of an electric machine. The computer data signal comprising code configured to cause a controller to implement the method for estimating a parameter of an electric machine as described above.

BRIEF DESCRIPTION OF THE DRAWINGS

Referring now to the drawings wherein like elements are numbered alike in the several figures.

DETAILED DESCRIPTION OF AN EXEMPLARY EMBODIMENT

Figure 1:
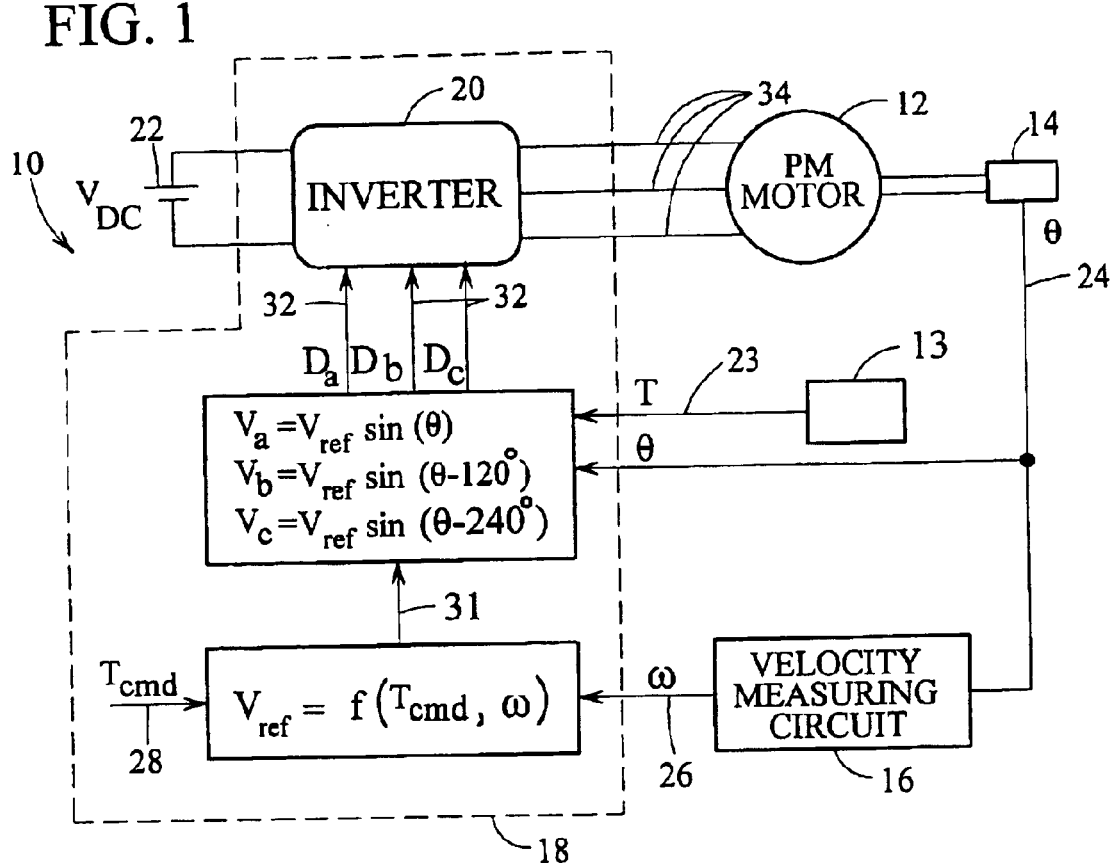
FIG. 1 is a block diagram depicting a motor control system.

In many practical applications of motor control, such as electronic power steering systems, it is often the case that cost and design considerations prohibit the use of temperature sensors placed directly on the motor windings or the magnets. However, such data is used to maintain motor torque accuracy over temperature, build, and life variations of the key parameters in a voltage mode controlled system. To insure adequate torque control and operation of a motor in an electronic power steering system it has become desirable to compensate the control of the motor for variations in motor parameters such as, but not limited to, motor resistance R, and motor constant $K_e$ as a function of temperature, build, and life. In a motor control system, a motor employing voltage mode control is controlled via an applied motor voltage, not the motor current. However the torque produced by the motor is proportional to the motor current. Therefore, variations of the motor parameters such as those described directly impart inaccuracies in the control system. The motor parameter variations generate direct torque variations and accuracy errors as a function of build, life, and temperature variations. Therefore, a system that compensates for motor parameter variations as a function of temperature, build, and life may exhibit improved response and more accurate control. As such, a motor parameter estimation/compensation scheme that accounts for such variations is disclosed. Generally, build and life deviations may be compensated for by means of long-term compensation of modeled motor parameters. This is usually the case because such deviations vary slowly over the operational life of a motor. However, the temperature variations induced become much more evident as a result of the repeated operational cycling of the electric motor. Therefore, emphasis on temperature estimation addresses the evident temperature dependent characteristics of the motor parameters being estimated. Thus, a detailed analysis supporting the estimation of various temperatures within the system is provided to facilitate the motor parameter estimation.

Disclosed herein in the several embodiments are methods and systems for estimating the temperature and parameters of an electric machine. More particularly, the disclosed embodiments identify models to simulate the variation of the motor parameters as a function of temperature, build and life. Particular to this variation is identification of the coefficients that characterize the change in the motor parameters with temperature, and predictions for build, and life variations. For example, for the temperature variation, the models simulate the effects of three coefficients: first, the thermal coefficient of resistivity of the substrate silicon in the switching devices employed to control the motor; second, the thermal coefficient of resistivity of the copper utilized in the motor windings; finally, the thermal coefficient of magnetic field strength of the magnets employed in the motor. Likewise, selected estimates define and characterize the variations in the motor control system components as a function of build and life.

The disclosed methodologies include, but are not limited to, feedback methodologies and predictive or feedforward methodologies. In addition, combined methodologies utilizing both feedback and feedforward parameter estimation are disclosed. An exemplary embodiment of the invention, by way of illustration, is described herein and may be applied to an electric motor in a vehicle steering system. While a preferred embodiment is shown and described, it will be appreciated by those skilled in the art that the invention is not limited to the embodiment described herein, but also to any control system employing an electric machine where parameter and temperature estimates are desired.

Referring now to the drawings in detail, FIG. 1 depicts a PM electric machine system where numeral 10 generally indicates a system for controlling the torque of a PM electric machine (e.g. a motor), hereinafter referred to as a motor 12. The torque control system hereafter system 10 includes, but is not limited to, a motor rotor position encoder 14, a velocity measuring circuit 16, a current measurement device (not shown), a controller 18, power circuit or inverter 20 and power source 22. Controller 18 is configured to develop the necessary voltage(s) out of inverter 20 such that, when applied to the motor 12, the desired torque is generated. Because these voltages are related to the position and velocity of the motor 12, the position and velocity of the rotor are determined. The rotor position encoder 14 is connected to the motor 12 to detect the angular position of the rotor denoted θ. The encoder 14 may sense the rotary position based on optical detection, magnetic field variations, or other methodologies. Typical position sensors include potentiometers, resolvers, synchros, encoders, and the like, as well as combinations comprising at least one of the forgoing. The position encoder 14 outputs a position signal 24 indicating the angular position of the rotor. The current measurement device, detects the current provided to the motor 12 and transmits a signal to the controller 18 indicative of the current value. In an exemplary embodiment, the current is measured at the inverter 20, however, it is evident that the current could be measured at any location convenient to a particular implementation. Moreover, it should also be evident that other equivalent means of ascertaining the value of the current are possible.

Figure 2:
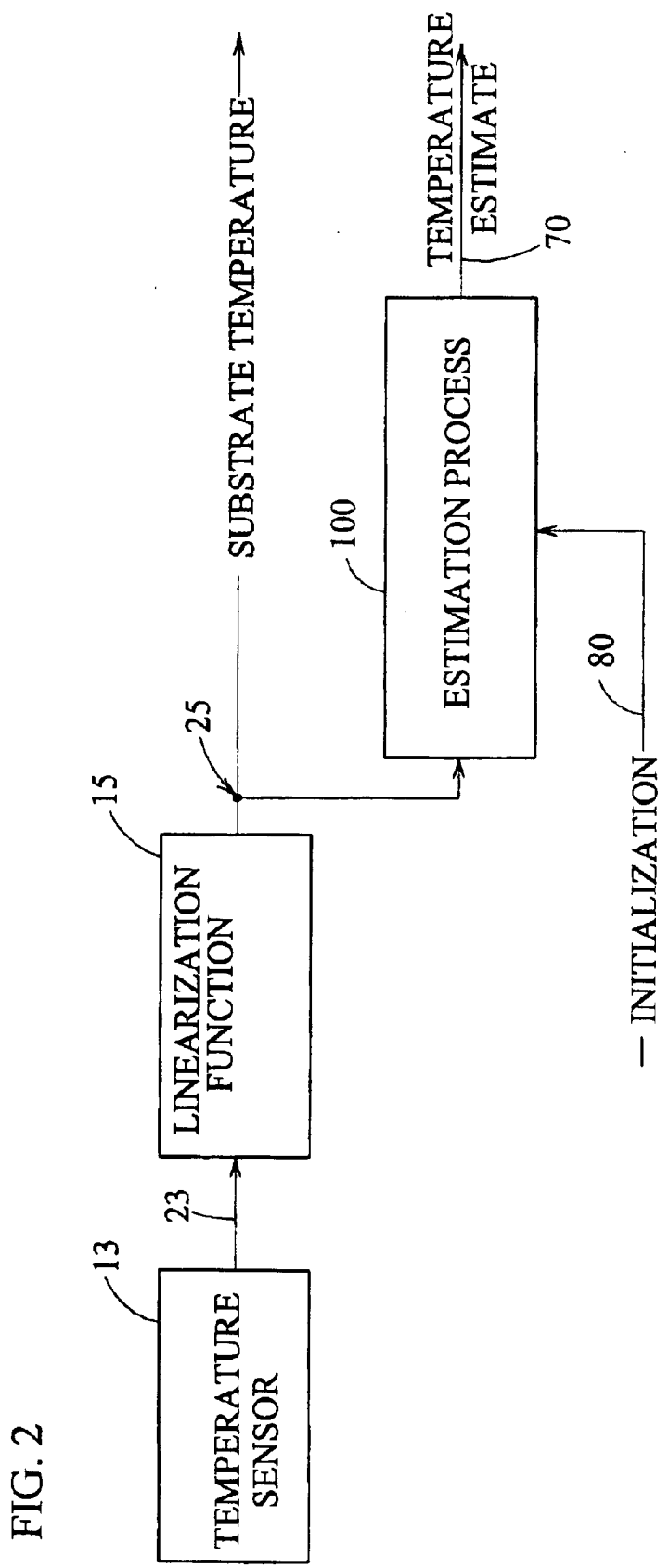
FIG. 2 is a block diagram of an exemplary temperature estimation system.

In an exemplary embodiment and referring also to FIG. 2, the temperature of the motor 12 is measured utilizing one or more temperature measuring device(s) or sensor(s) 13 located at the substrate of a switching device which controls the application of excitation voltage to the motor 12. It should be understood that while an exemplary embodiment discloses placing a temperature sensor 13 at the switching device substrate, various other locations are possible. Alternative locations may include placement in or in proximity to: the motor 12, the controller 18, and the like. The temperature sensor 13 transmits a temperature signal 23 to the controller 18 to facilitate the processing prescribed herein. Typical temperature sensors include, but are not limited to, thermocouples, thermistors, resistive thermal devices (RTD), semiconductors, and the like, as well as combinations comprising at least one of the foregoing, which when appropriately placed provide a calibratable signal proportional to the particular temperature.

The position signal 24, velocity signal 26, temperature signal 23, current value, and a torque command signal 28 are applied to the controller 18. The torque command signal 28 is representative of the desired motor torque value. The controller 18 processes all input signals to generate values corresponding to each of the signals resulting in a rotor position value, a motor velocity value, a temperature value and a torque command value being available for the processing in the algorithms as prescribed herein. It should be noted that while a velocity signal 26 is disclosed as derived from other measured parameters, e.g., motor position, in an exemplary embodiment, such a signal may also be a measured signal. For example, motor velocity may be approximated and derived as the change of the position signal 24 over a selected duration of time or measured directly with a tachometer or similar device.

Measurement signals, such as the abovementioned are also commonly linearized, compensated, and filtered as desired or necessary to enhance the characteristics or eliminate undesirable characteristics of the acquired signal. For example, the signals may be linearized to improve processing velocity, or to address a large dynamic range of the signal. In addition, frequency or time based compensation and filtering may be employed to eliminate noise or avoid undesirable spectral characteristics.

The controller 18 determines the voltage amplitude $V_{ref}$ 31 required to develop the desired torque by using the position signal 24, velocity signal 26, and torque command signal 28, and other motor parameter values. The controller 18 transforms the voltage amplitude signal $V_{ref}$ 31 into three phases by determining phase voltage command signals $V_a$, $V_b$, and $V_c$ from the voltage amplitude signal 31 and the position signal 24. Phase voltage command signals $V_a$, $V_b$, and $V_c$ are used to generate the motor duty cycle signals $D_a$, $D_b$, and $D_c$ 32 using an appropriate pulse width modulation (PWM) technique. Motor duty cycle signals 32 of the controller 18 are applied to a power circuit or inverter 20, which is coupled with a power source 22 to apply phase voltages 34 to the stator windings of the motor in response to the motor voltage command signals. The inverter 20 may include one or more switching devices for directing and controlling the application of voltage to the motor. The switching devices may include, but need not be limited to, switches, transmission gates, transistors, silicon controlled rectifiers, triacs and the like, as well as combinations of the foregoing. In this instance, for example, silicon power transistors, often MOSFETs, are employed.

In order to perform the prescribed functions and desired processing, as well as the computations therefore (e.g., the execution of voltage mode control algorithm(s), the estimation prescribed herein, and the like), controller 18 may include, but not be limited to, a processor(s), computer(s), memory, storage, register(s), timing, interrupt(s), communication interfaces, and input/output signal interfaces, as well as combinations comprising at least one of the foregoing. For example, controller 18 may include signal input signal filtering to enable accurate sampling and conversion or acquisitions of such signals from communications interfaces. Additional features of controller 18 and certain processes therein are thoroughly discussed at a later point herein.

Temperature Estimation

Identified herein as exemplary embodiments are methodologies for estimating motor parameters from the components of the temperature as measured from the power transistor substrate. Understanding the origin of these temperature components helps to identify and quantify the relationship between the power transistors and motor. Therefore, it is important to appreciate and understand the principles of conservation of energy (first law of thermodynamics) particularly as applied to the disclosed embodiments. Equation (1) states the first law of thermodynamics:

$$E_{in} + E_g - E_{out} = E_{st} \quad (1)$$

where $E_{in}$ is the energy added or transferred to a system; $E_g$ is the energy converted to thermal energy manifested as heat; $E_{out}$ is the energy transferred out of a system or released to the ambient; and $E_{st}$ is the energy stored in the system.

A system 10 as depicted in FIG. 1 may include, but is not necessarily limited to, three primary components to affect control, in this instance of a vehicle: a motor, a controller and an assist mechanism. Within the system mechanical, electrical, and electromagnetic energy are converted to thermal energy ($E_g$). Electrical energy is converted to thermal energy in the controller from various components. For example, a voltage regulator, shunt resistor, bus capacitors, power relay, power transistors, and the like, as well as other various electronic components. The motor 12 also converts electrical energy into thermal energy in the copper windings. The core losses in the motor 12 are minimal and therefore electromagnetic heating is neglected with respect to thermodynamic considerations. The assist mechanism provides mechanical force multiplication and converts mechanical energy into thermal energy in the form of heat generated from friction. Some of these energies are stored within components ($E_{st}$), while others are released to the ambient environment within the system by convection ($E_{out}$). In addition, the energy transferred to the ambient may also enter other components ($E_{in}$). Finally, energy may be supplied from outside the system 10. The vehicle heating system, for example, in automobile applications could potentially cause an 80° C. temperature rise under certain conditions.

To facilitate effective temperature estimation the relationship between the measured temperature and the transistor silicon, motor copper windings, and motor magnet temperatures is determined. Temperature estimation may be complicated, in that the measured temperature to be utilized may include multiple coupled components. Therefore, separating these components from a single measured temperature is desirable to enhance the accuracy of a temperature estimate. Identified herein in the exemplary embodiments are components of the power transistor substrate temperature and a methodology for performing the temperature estimation.

For the purpose of this analysis, consideration will be given to four components of the measured temperature: convection from the motor; conduction and convection from the power transistors; convection from the controller 18 electronics; and the convection from the vehicle. To illustrate the temperature estimation, equations are derived for the motor copper winding and the transistor silicon temperatures. Thereafter, the additional components are identified. Finally, a temperature estimation algorithm will be identified that includes all the components.

A description of the time differential of energy (i.e., power) relates the temperature the copper windings of the motor 12 to the silicon temperature of the power transistor. The power generated from electrical energy is the product of the motor current I squared and electrical resistance R. The electrical resistance R is a function of geometry l/A, conductivity σ and temperature T.

$$\dot{E}_g = I^2 R, \quad R = \frac{1}{\sigma A}(1 + a\Delta T) \quad (2), (3)$$

When the power transistors are activated current conducts through the transistors' silicon and the motor copper windings. The power stored is a function of volume V, density ρ, specific heat c, and temperature T.

$$\dot{E}_{si} = \rho V c \frac{dT}{dt} \quad (4)$$

Convection is a function of the coefficient of convection h, surface area $A_s$, and the difference in surface temperature $T_s$ and a boundary layer temperature defined here as ambient temperature $T_a$. In the instance of the exemplary embodiment disclosed herein, for simplicity, the power transistors and motor windings share the same ambient temperature within a few degrees of each other.

$$\dot{E}_{out} = hA_s(T_s - T_a) \quad (5)$$

Therefore, when equations (2), (4) and (5) are substituted into equation (1) to sum the associated energy in the system, the relationship in thermal power output between the silicon and copper becomes a function of geometry (l, A, $A_s$, V), mass, material properties (σ, ρ, c, h) and temperature.

$$I^2R - hA_s(T_s - T_a) = \rho V c \frac{dT}{dt} \quad (6)$$

Equation (6) may be solved for the surface temperature $T_s$, thereby yielding in equation (7) two separate temperatures: an ambient temperature $T_a$, and a surface temperature $T_s$ representing the substrate temperature value 25 (or motor temperature). The ambient temperature $T_a$ includes the convection from the vehicle and controller electronics. The surface temperature $T_s$ includes convection from the power transistors of the inverter 20 or motor 12. The measured substrate temperature value 25 (as linearized) is separated from the power transistors by a conduction path. This conduction path is considered when assigning values to h, A, ρ, V and c for the substrate. Moreover, the $I^2R$ loss in the silicon is transferred across a thermal conduction path characterized by k·A/L where k is the coefficient of thermal conductivity of the silicon substrate. Consideration of this k·A/L conduction path is not represented in equation (7) for the representation of the substrate temperature value 25 (or motor temperature).

$$T_s = T_a + \frac{I^2R}{hA_s}\left(1 - \exp\left(-t\frac{hA_s}{\rho V c}\right)\right) \quad (7)$$

It is noteworthy to recognize that because the current is shared between the silicon and copper, equation (7) indicates that the difference in a change in temperature above ambient between the copper and the silicon is characterized by material properties (h, σ) and geometry of both the copper and the silicon. Recall the limit of exponentials as time goes to infinity.

$$\lim_{t \to \infty} \exp\left(-t\frac{hA_s}{\rho V c}\right) = 0$$

The steady-state temperature rise above ambient for the substrate and motor now becomes more apparent.

$$\Delta T_{Si} = \frac{I^2 R_{Si}}{h_{Si} A_{s\_Si}}, \quad \Delta T_{Cu} = \frac{I^2 R_{Cu}}{h_{Cu} A_{s\_Cu}}$$

To find the difference in the total change in temperature above ambient between the copper and the silicon find the ratio of the steady-state temperature rise. Notice how the current term cancels out.

$$\frac{\Delta T_{Cu}}{\Delta T_{Si}} = \frac{R_{Cu} h_{Si} A_{s\_Si}}{R_{Si} h_{Cu} A_{s\_Cu}} \quad (8)$$

Equations (7) and (8) illustrate a principle that may be employed to implement the temperature estimation. Under close examination it may be demonstrated that a filter (in this instance, first order) and gain may be implemented to have a response to a measured temperature, which would duplicate these results when the ambient temperature $T_a$ is treated as a separate component. The time constant in equation (7) is $$\frac{\rho V c}{hA_s}$$

When equation (7) is applied to the measured silicon, this time constant is used to calibrate the lead portion of all three filters since it is the silicon that is actually being measured. In other words, the dynamics of the measured substrate temperature is cancelled out. When equation (7) is applied to the motor copper windings, magnet and power transistors these time constants are used to calibrate the lag portion of all three filters. In other words, the dynamics of the motor copper windings, magnet and power transistors are estimated. The frequency of the filters is determined from the time constants in the following equation, $$f = \frac{1}{2\pi\tau} = \frac{hA_s}{2\pi\rho V c}$$

The gains are determined by the ratio of the steady-state delta-temperatures described in equation (8).

An exemplary embodiment includes a method and system for temperature estimation of the power transistor silicon, motor copper windings and rotor magnets of a motor 12 in accordance with the abovementioned disclosure and analysis. This is achieved by measuring at least one temperature, in this instance, on the power transistor substrate. This measured temperature is then processed to estimate all three temperatures utilizing the abovementioned filter estimation.

Feedforward Parameter Estimation and Temperature Estimation

An exemplary embodiment includes a motor control method and system employing a process for temperature estimation of the power transistor silicon, motor copper windings and rotor magnets in accordance with the abovementioned disclosure and analysis to facilitate motor parameter estimation. This is achieved by measuring at least one temperature, in this instance, on the power transistor substrate. This measured temperature is then processed to estimate all three temperatures utilizing filter estimation, the abovementioned analysis, which is provided above.

An exemplary embodiment includes a feedforward parameter estimation method and system by which actual operating motor temperatures and parameters may be estimated. FIG. 2 depicts a block diagram for practicing an exemplary embodiment. The requisite processing for performing the method disclosed may, but need not be performed in controller 18. Such processing may also be distributed to or across a variety devices provided in the system 10 as desired and necessary for practicing the invention. Referring also to FIG. 1, a temperature sensor 13, is used to directly measure the temperature of motor controller 18 for an electric motor 12. The temperature sensor 13 is preferably affixed to a power transistor substrate (not shown), which is a component of the motor controller 18 or inverter 20. It should be noted that the temperature sensor 13 as described may also be placed in other locations as practical considerations permit. Moreover, placement may also be internal to the motor 12, controller 18, or inverter 20 or external. In either instance appropriate consideration of the thermodynamic considerations is preferred to ensure generation of an accurate thermal model. In an exemplary embodiment, motor parameters are estimated and compensated as a function of temperature. To further enhance the compensation and estimation, and yet address the cost ramifications of additional sensors, the application of multiple sensors is reduced by further estimation of temperatures in the motor controller 18 and electric motor 12. Therefore, multiple embodiments are disclosed herein disclosing various means for temperature determination and ultimately motor parameter estimation.

Referring once again to FIG. 2, to determine a temperature estimate, the output of a temperature sensor 13, temperature signal 23 is transmitted through a linearization function mechanism 15 to compensate for non-linearities in the measurement. Linearization function mechanisms are well known in the art and may comprise either hardware or software embodiments, or a combination of both. Thereafter the linearized temperature signal denoted the substrate temperature value 25 is directed to a temperature estimation process 100, the output of which represents the temperature estimate 70.

Figure 3:
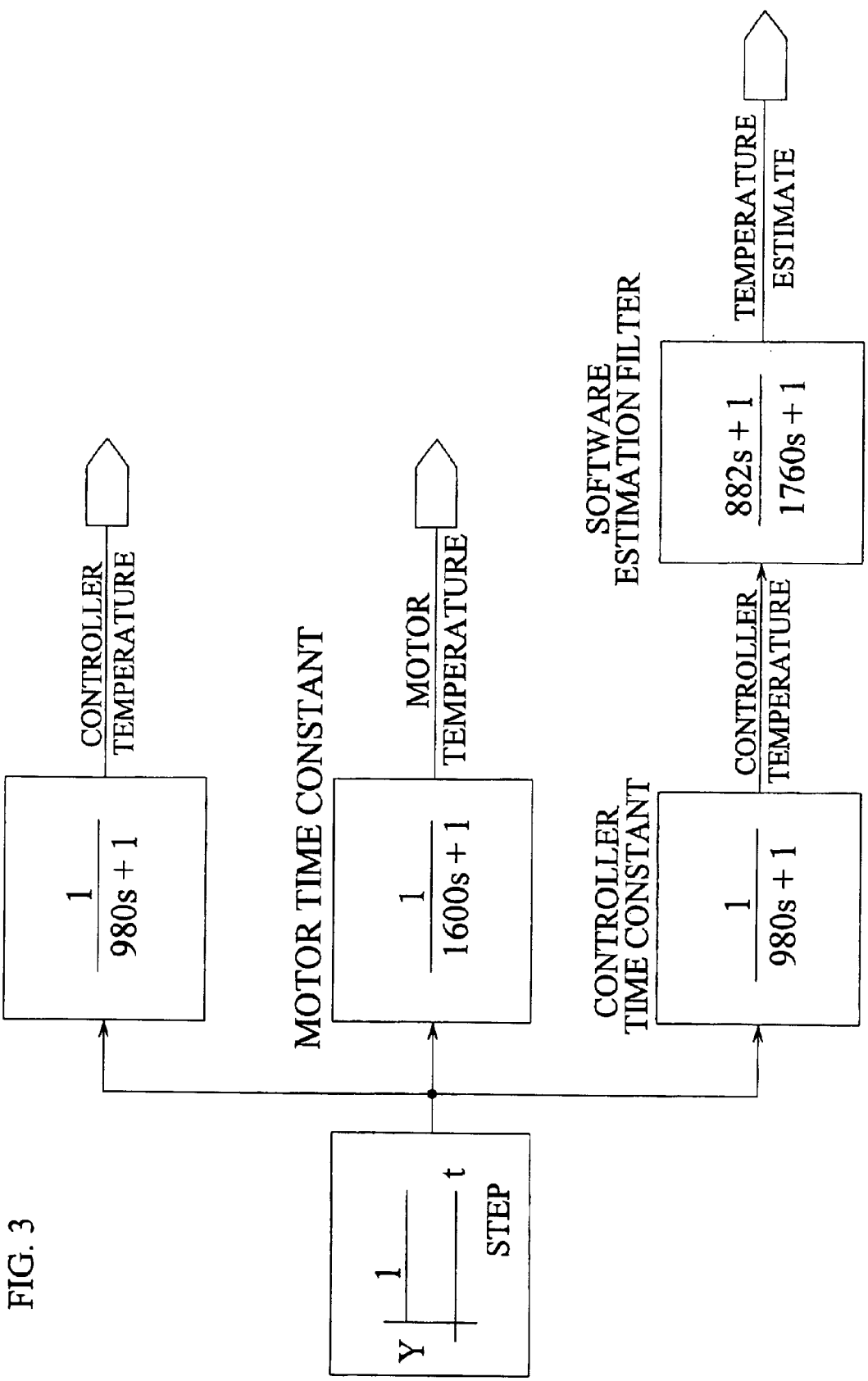
FIG. 3 is a block diagram depicting a model of the thermal characteristics for a motor, a motor controller, and a temperature estimation filter.
Figure 4:
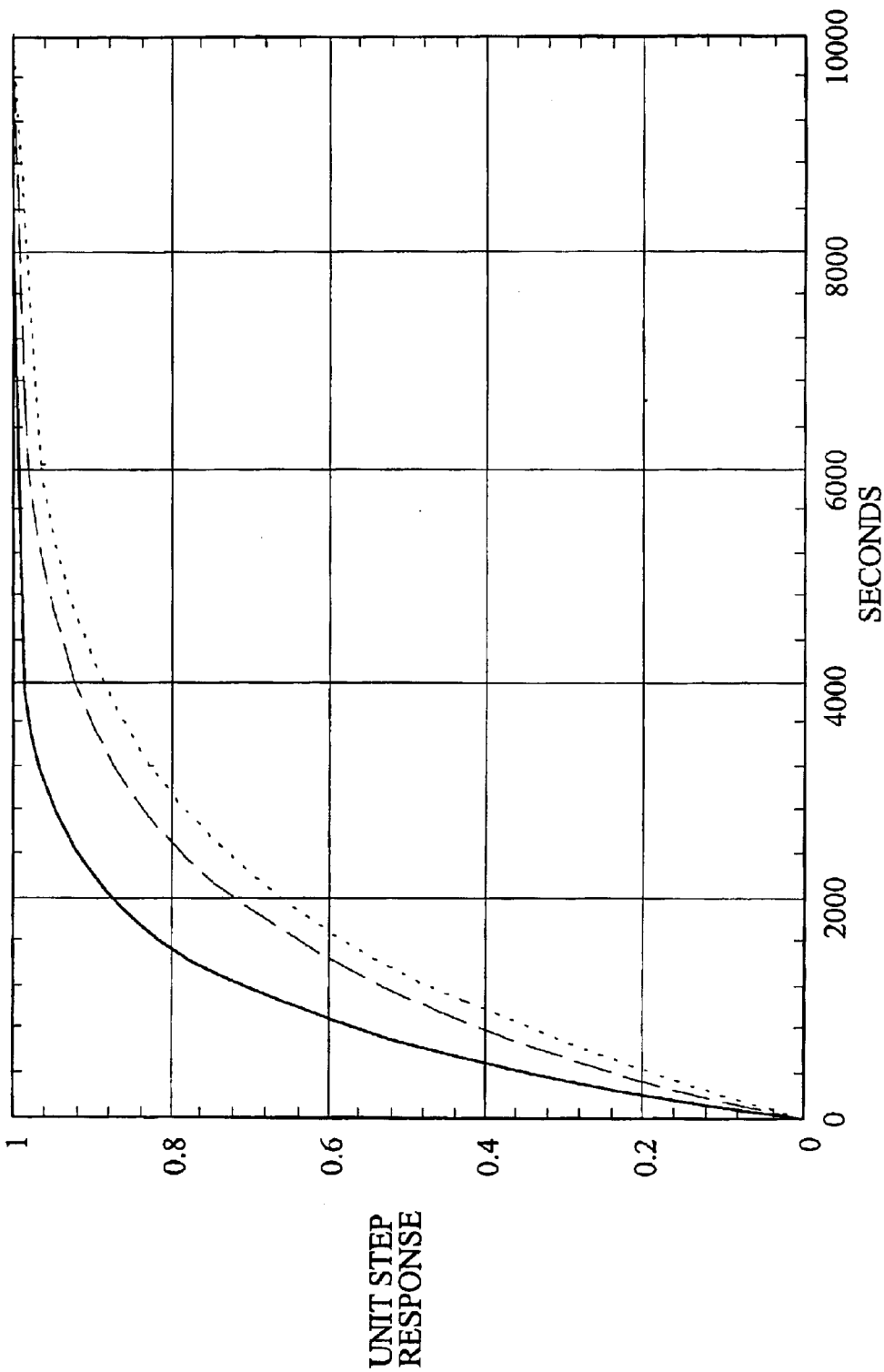
FIG. 4 is an illustrative graphical depiction of the unit step response of the block diagram models in FIG. 3.

One example of a temperature estimation process 100 as depicted in FIG. 2, may comprise a simple low pass filter having a cut off frequency designed to estimate the thermal time constant of the motor. However, it has been found that even with careful adjustment of the time constant of such a temperature estimation process 100, the transient response may still show error between the actual temperature of the motor and the temperature estimate 70, especially under dynamic conditions. Therefore, in order to improve the transient accuracy of the filter estimate, a filter structure such as the one shown in FIG. 3 also employing lag, lead-lag, and/or lag-lead filters may be used. FIG. 4 illustrates a unit step response of an exemplary lead-lag filter estimate as compared with the both the actual motor and motor controller temperatures. An error in the filter parameters has been introduced to illustrate how the estimated response closely resembles the desired response even with variation of the filter parameters.

Figure 5:
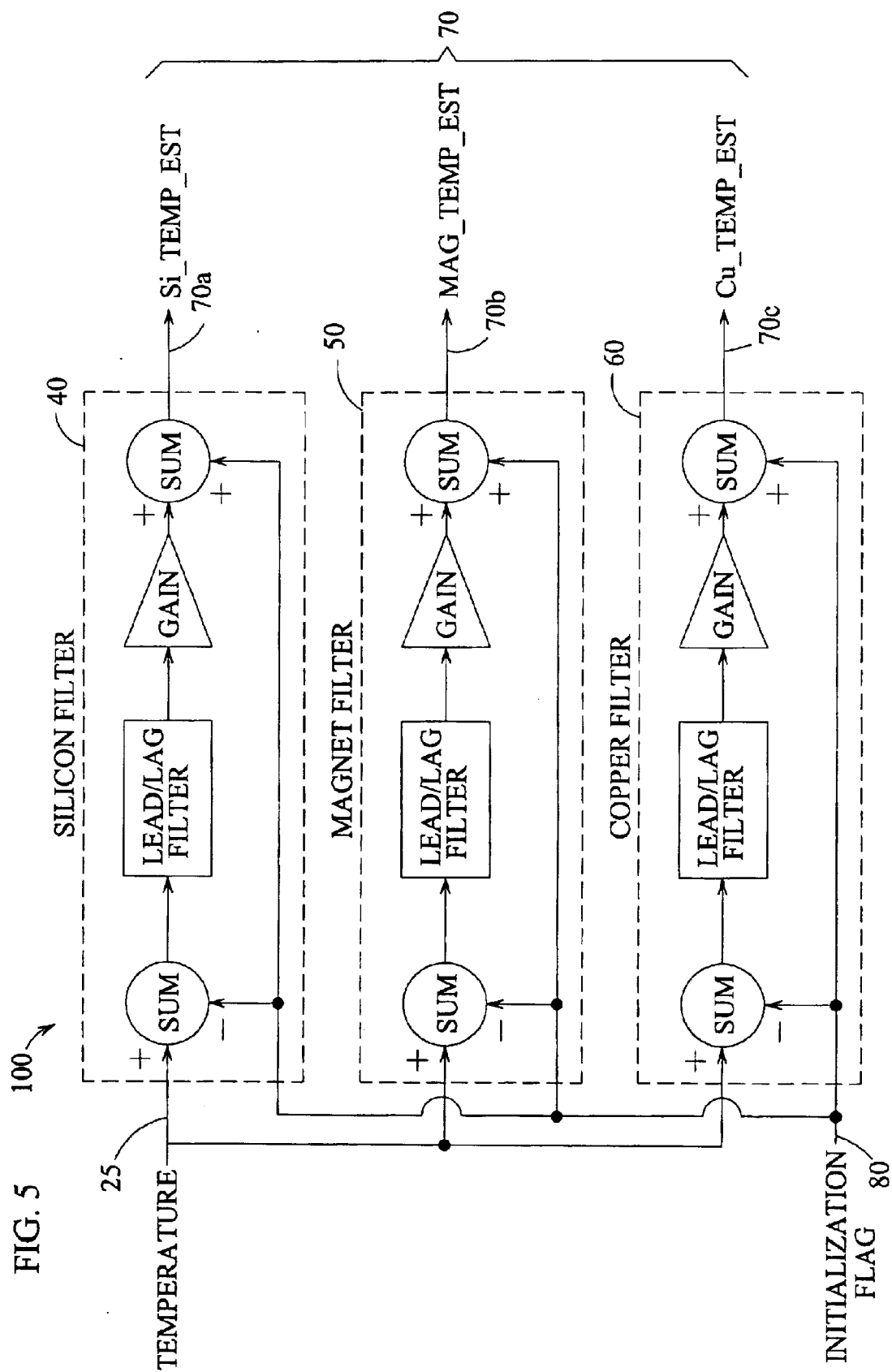
FIG. 5 is a block diagram of an exemplary embodiment of a temperature estimation filter.

In an exemplary embodiment as depicted in FIG. 5, multiple temperature estimation filters are employed to facilitate the temperature estimation and thereby, the motor parameter estimation. Depicted in the figure, are actually three separate estimation filters, which serve to estimate three operating temperatures in an exemplary embodiment: the temperature of the motor controller silicon, the temperature of the motor magnet and the temperature of the copper winding of the motor. Hereinafter, the three temperature estimation filters shall be referred to as the silicon temperature estimate filter 40, the magnet temperature estimation filter 50, and the copper winding temperature estimate filter 60. It is important to appreciate that while the disclosed exemplary embodiment identifies three filters and three estimated temperatures, this should not be considered limiting. It will be apparent that the temperature estimation may be applied to as many temperature estimates or parameter estimates as desired and practical for estimation or to enhance the accuracy or response characteristics of the estimation.

FIG. 5 depicts the block diagram, which illustrates the processing of the substrate temperature value 25 (FIG. 2 as well). As can be seen, the substrate temperature value 25 is transmitted to the silicon temperature estimate filter 40, the magnet temperature estimation filter 50, and the copper winding temperature estimate filter 60. In this manner, multiple temperature estimate(s) 70, comprising; 70a for silicon, 70b for magnet, and 70c for copper temperature estimates respectively, are generated using a single temperature signal 23 from the temperature sensor 13.

Figures 6, 7:
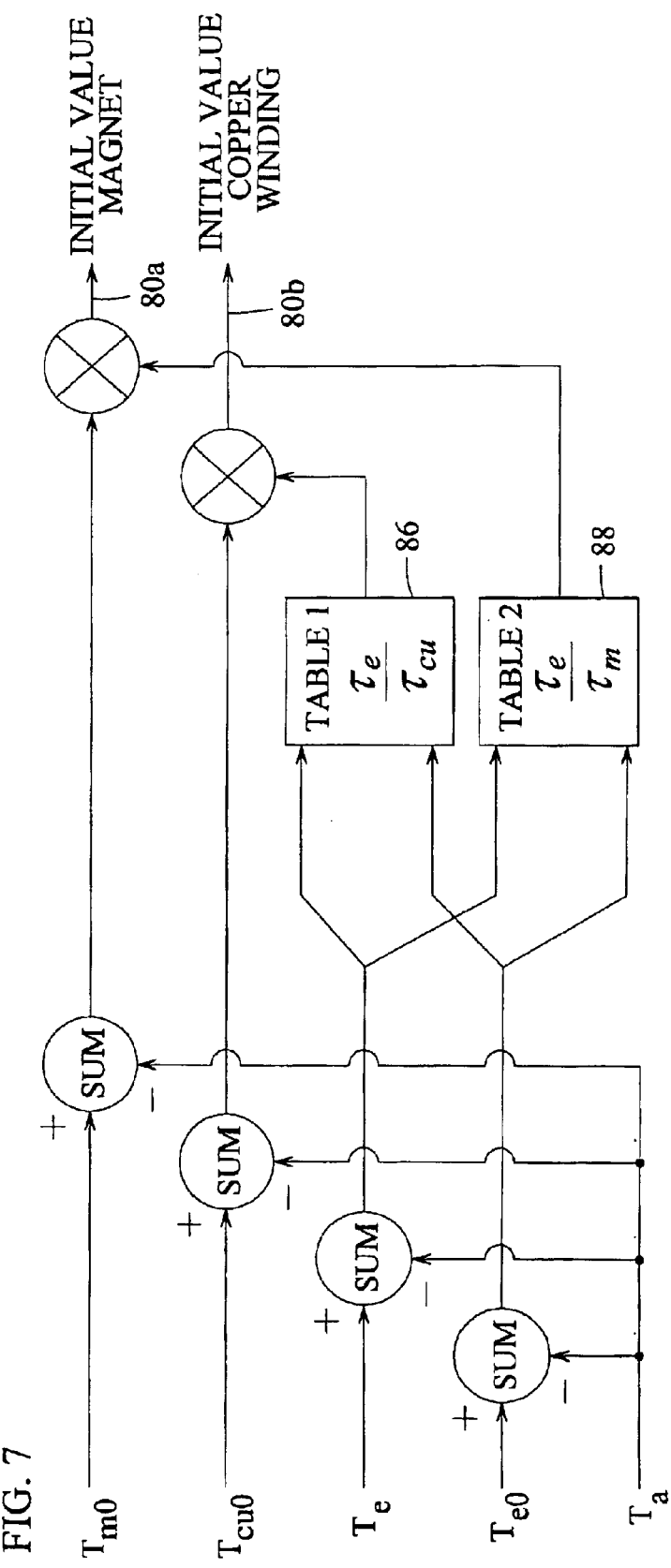
FIG. 6 is a table of the characteristics of the filters shown in FIG. 5.
FIG. 7 is a schematic of a filter initialization implementation.

Referring to FIG. 5, in an embodiment, the silicon, magnet, and copper winding temperature estimate filters 40, 50, and 60 are implemented as first order filters. Once again, first order lead-lag and lag-lead filters are selected because equation 7 indicates such a filter implementation will provide an accurate estimate with the expected response characteristics. The range of the lead and lag filters and gain amplifiers is intended to cover multiple levels of controller and motor thermal coupling, placement within vehicle, convection schemes, power distribution and heat sink capability. Depending on the above mentioned thermal characteristics between the motor and controller the gain amplifier could be less than unity, unity or greater than unity. As shown in FIG. 6, in an exemplary embodiment, the lag frequency range of the silicon temperature estimate filter 40 is between about 53 $\mu$Hz (microhertz) and about 320 $\mu$Hz and the lead frequency range is between about 53 $\mu$Hz and about 160 $\mu$Hz. The lag frequency range of the magnet temperature estimate filter 50 is between about 35 $\mu$Hz and about 80 $\mu$Hz and the lead frequency range is between about 53 $\mu$Hz and about 160 $\mu$Hz. The lag frequency range of the copper winding temperature estimate filter 60 is between about 35 $\mu$Hz (microhertz) and about 80 $\mu$Hz and the lead frequency range is between about 53 $\mu$Hz and about 160 $\mu$Hz. The temperature estimate filters (e.g., 40, 50, and 60) respectively include an option to disable the zero or the combination of the zero and the pole yielding a low pass filter or a unity gain respectively. It will be appreciated that the temperature estimate filters 40, 50, and 60 respectively may be implemented employing a variety of methods including but not limited to passive, active, discrete, digital, and the like, as well as combinations thereof. In an exemplary embodiment, for example, each of the temperature estimation filters 40, 50, and 60 is digitally implemented and operates at the rate of about 128 milliseconds. Moreover, it should also be noted that the gain amplifiers depicted in the figures are included for clarity and completeness. It is well known that such gain amplifiers depicted with each of the temperature estimate filters 40, 50, and 60 may, like the filters be implemented employing numerous variations, configurations, and topologies for flexibility.

It is noteworthy to recognize and appreciate that because the thermal time constant of a motor winding is relatively long (over 20 minutes), it takes a long time for the temperatures of the motor 12 and the substrate to equalize after a system shutdown if the motor and substrate temperatures were significantly different upon shutdown. When the system is subsequently "powered on" again such a difference may cause an introduction of an error in the temperature estimates. To address this anomaly, an initialization scheme is employed at power application, which reduces the impact of the abovementioned temperature differences. In an embodiment, an initialization signal 80 is provided for initialization of the silicon, magnet, and copper temperature estimate filters 40, 50, and 60 respectively to the substrate temperature value 25 following linearization of the temperature signal 23 as measured by temperature sensor 13. It is also noteworthy to appreciate that such an initialization may introduce an offset error into the motor temperature estimate, which could require a relatively long time to be significantly reduced or eliminated. As a result, the system 10 may experience decreased torque accuracy until the error is sufficiently reduced. Such an offset error may be acceptable in some applications and yet be objectionable in others and therefore more sophisticated initialization schemes may prove beneficial.

Accordingly, an alternative embodiment may include an additional initialization processes whereby the temperature estimation process 100 (e.g., comprising 40, 50, and 60) continues to execute after the system 10 is shut off, until such time as the temperature estimate 27 from temperature estimation process 100 approaches a steady state value. If the temperature estimation process 100 is still running when the system is activated, then no initialization to the temperature estimation process 100 would be necessitated.

Yet another exemplary embodiment addresses the estimation filter initialization error by initializing the digital temperature estimation filter(s) of temperature estimation process 100 with reduced error using information from another sensor should it be available. In such an exemplary embodiment, an engine coolant temperature, for instance, may be available and utilized. For example, if $\tau_e$ is the time for the engine to cool by 63%, then $$T_e = T_a + (T_{e0} - T_a) e^{-t/\tau_e} \tag{9}$$

where $T_e$ is the engine coolant temperature, $T_a$ is the ambient temperature, and $T_{e0}$ is the hot engine coolant temperature when the ignition is first turned off. To approximate the length of time the ignition has been off equation (9) can be rewritten as $$t = -\tau_e \ln\left(\frac{T_e - T_a}{T_{e0} - T_a}\right) \tag{10}$$

If $\tau_{cu}$ and $\tau_m$ are the times for the motor windings and magnets to cool by 63% respectively, then $$T_{cu} = T_a + (T_{cu0} - T_a) e^{-t/\tau_{cu}} \tag{11}$$

and $$T_m = T_a + (T_{m0} - T_a) e^{-t/\tau_m} \tag{12}$$

where $T_{cu}$ and $T_m$ are the motor winding and magnet temperatures and $T_{cu0}$ and $T_{m0}$ are the hot motor winding and magnet temperatures when the ignition is first turned off. Substituting equation (10) into equations (11) and (12) the motor winding and magnet temperatures can be initialized in terms of calibratable time constants, recorded shut-down temperatures and the initial engine coolant temperature:

$$T_{cu} = T_a + (T_{cu0} - T_a) \underbrace{\left(\frac{T_e - T_a}{T_{e0} - T_a}\right)^{\frac{\tau_e}{\tau_{cu}}}}_{\text{Filter initial value}} \tag{13}$$

$$T_m = T_a + (T_{m0} - T_a) \underbrace{\left(\frac{T_e - T_a}{T_{e0} - T_a}\right)^{\frac{\tau_e}{\tau_m}}}_{\text{Filter initial value}} \tag{14}$$

It is noteworthy to appreciate that the multiplication term with the present and last engine coolant temperatures $T_e$ and $T_{e0}$ is a fraction between zero and one indicating the change in the final recorded temperatures $T_{cu0}$ and $T_{m0}$ since the system was last shut down. The product of these two terms (from equations (13) and (14)) is then employed to initialize the digital temperature filters. When the fraction term is zero the digital filter is likewise initialized to zero and the motor winding and magnet temperatures become equal to the ambient temperature as initialized before. It should be noted that many of the equations are presented as material specific. However, these equations may be generalized to apply to any material of interest by substituting the appropriate subscripts in the equations. For example, with equation (14), which is specific to the magnetic material could be generalized by substituting as follows:

$$T_x = T_a + (T_{x0} - T_a) \underbrace{\left(\frac{T_e - T_a}{T_{e0} - T_a}\right)^{\frac{\tau_e}{\tau_x}}}_{\text{Filter initial value}} \tag{14'}$$

where the m subscripts are replaced by an x to indicate a generalized application to another material.

The embodiment as disclosed may be implemented utilizing two 2-dimensional look-up tables for each digital filter initial value. FIG. 7 depicts an implementation of equations (1) and (14) for generating the filter initialization signal 80 for the magnet and copper winding filters 80*a* and 80*b* respectively. Look-up tables 86 and 88 respectively may employ linear interpolation, quantization, and the like to reduce the size of, or number of entries in the tables. It should be appreciated that while an exemplary embodiment is disclosed identifying an initialization for the magnet and copper filters (e.g., 50, and 60), such an embodiment is equally applicable to any estimation filter utilized.

Figure 8:
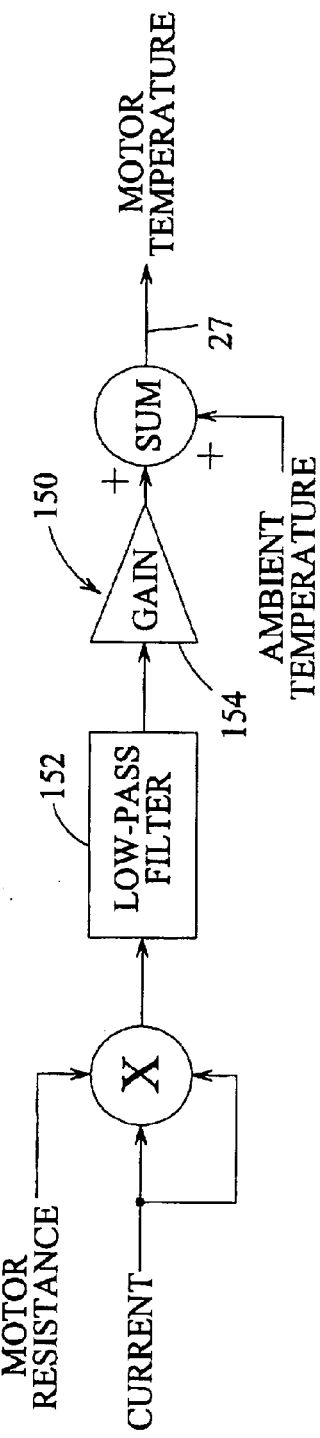
FIG. 8 is a block diagram depicting an alternative temperature estimation implementation.

In yet another exemplary embodiment, the disclosure outlined above is supplemented once again with additional filtering and estimation. The scheme outlined above provides a method for enhancing the initialization of the estimation filters 40, 50, and 60 (FIG. 5) under particular operating conditions. Each of the estimation filters 40, 50, and 60 (FIG. 5) employs the ambient temperature $T_a$ as one of the terms in the initialization equation(s) (e.g., equations (13) and (14)) to formulate the initialization signal 80. It is noted that under particular operating condition where the ambient temperature $T_a$ varies significantly, errors may be introduced after the initial ambient temperature is recorded. For example, if the estimation process 100 are initialized under extreme cold conditions, and then heating causes the ambient temperature to rise significantly. Under close examination of equations (7) and (8) it should also be evident that once again a simple filter and gain may be employed to accurately estimate the delta-temperature (e.g. the change in temperature above ambient) from a measured current and resistance when the ambient temperature is treated as a separate component. In an embodiment, a first order low-pass filter is utilized to simulate the desired response. FIG. 8 depicts a block diagram of a motor temperature estimation filter 150 employing this methodology. An alternative motor delta-temperature estimate signal 27*a* is generated by the motor temperature estimation filter 150. By using this alternative means of motor delta-temperature estimation as a reference, the ambient temperature recorded at initialization can be adjusted where appropriate. This alternate motor delta-temperature estimation can be processed from a current estimation and the motor resistance estimation features disclosed herein. The change in motor temperature with no other contributing factors, addressing only convection, can be simplified in the following equation:

$$\Delta T_m = I^2 R_m R_{therm}(1-e^{-t/\tau}) \tag{15}$$

where I represents a peak phase current of the motor (e.g., the total heat producing current), $R_m$ represents the resistance of the motor as may be estimated by the embodiments disclosed herein and $R_{therm}$ represents the thermal resistance associated with convection, $\tau$ represents the thermal time constant related to the heat transfer through the motor 12, the system 10 and the temperature control system. In an embodiment, a calibratable filter 152 provides the time element and a gain 154 provides for the thermal resistance $R_{therm}$ and other system variables. These other variables include convection and heat transfer from the controller. In an embodiment, the calibratable filter 152 may be a first order low pass filter. Although the time constant of the heat transferred from the controller may vary from the motor, it contributes as little as 10–15° C. It should be noted that this delta-temperature estimate is implemented as a motor delta-temperature estimate. It therefore follows that a silicon or magnet delta-temperature estimate may be implemented in a similar manner as well.

Figure 9:
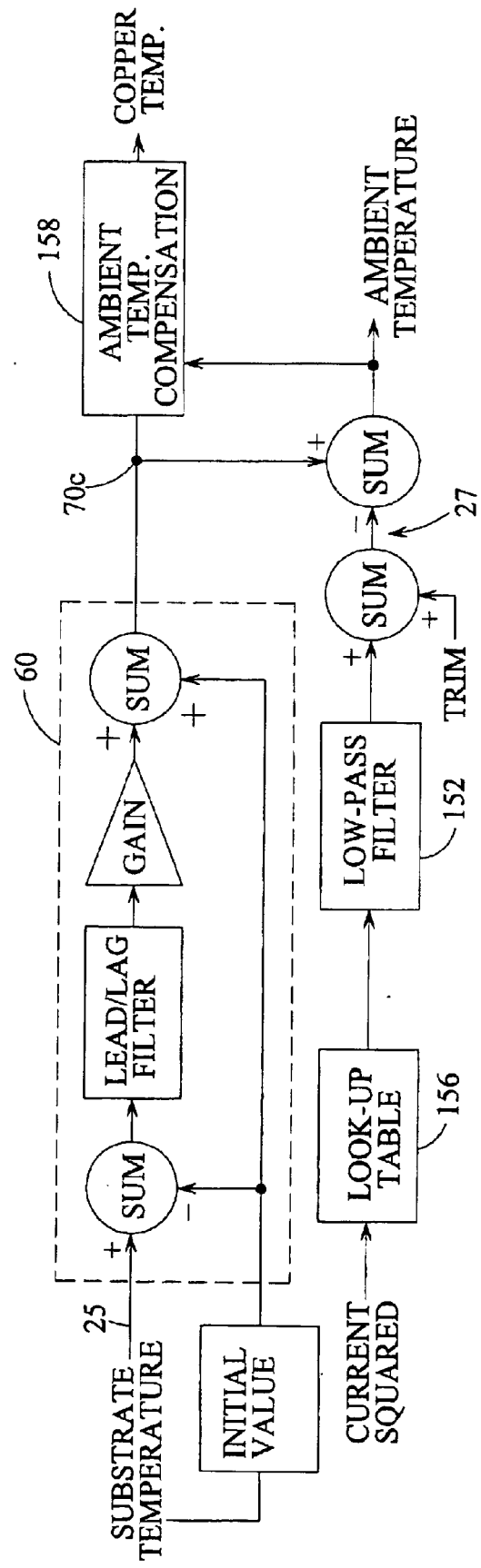
FIG. 9 is a block diagram depicting an alternative embodiment for temperature estimation with ambient temperature estimation.

Referring now to FIG. 9, a block diagram depicting the combined ambient temperature estimation/initialization scheme integrated with the temperature estimation process 100. These two approaches provide two methods of estimating the change in surface temperature from equation (7) without an estimation of the ambient temperature $T_a$. While the first method requires that a measured ambient temperature $T_a$ be known before filtering, the second method does not. Therefore, when these two methodologies are combined an estimation of the ambient temperature $T_a$ is the result. This is illustrated in FIG. 9 for the copper temperature estimation filter 60 as it may be implemented. It should be noted that the motor temperature estimation filter 150 as depicted in FIG. 8 may be further simplified to facilitate ease of implementation and processing burden for controller 18 by once again employing a lookup table 156.

It may be the standard condition or operation to use the initial substrate temperature 25 at start-up as the initial ambient temperature $T_a$. An accuracy range check may be employed to determine whether the ambient temperature estimation disclosed is needed and used to compensate the initial ambient temperature. Similar to the previous estimation methodologies, another filter (not shown), may be used to provide a slow and smooth transition from an initial ambient temperature to a new ambient temperature estimate. An offset term for trim adjustment is also included to account for constant heat transfer, known errors, or unanticipated errors and biases. When this delta motor temperature estimate 27 is subtracted from the estimate temperature (in this instance the winding copper temperature estimate 70c) the result is an estimation of the ambient temperature $T_a$. The estimated ambient temperature may thereafter be employed to compensate the respective temperature estimates e.g., 70a, 70b, and 70c as depicted at ambient temperature compensator 158.

It should be noted that this exemplary embodiment only utilizes one filter with estimate of ambient temperature $T_a$ (e.g., depicted with the copper estimation filter 60) as depicted in FIG. 9. The same ambient temperature estimate may, but need not be, utilized for additional parameter temperature estimation filters. For example, for the magnet temperature estimate, the same scheme may be employed, however, for the silicon estimation filter, to account for the previously mentioned difference in the ambient temperatures for the controller 18 and the motor 12, an additional offset calibration should be added to the ambient temperature estimate. Additionally, it should be noted that the initial value of the measured substrate temperature value 25 may be adequate as the ambient temperature $T_a$ over the duration of the system operation within a required threshold. Then, if or when the ambient estimation crosses such a threshold as may occur during excessive controller or vehicle heating the initial value is compensated by an additional ambient temperature estimation process following the (copper) estimation filter 60. It should also be noted that the compensated ambient temperature estimate may further require adjusted scaling in response to the gain now applied within the copper estimation filter 60.

Figure 10:
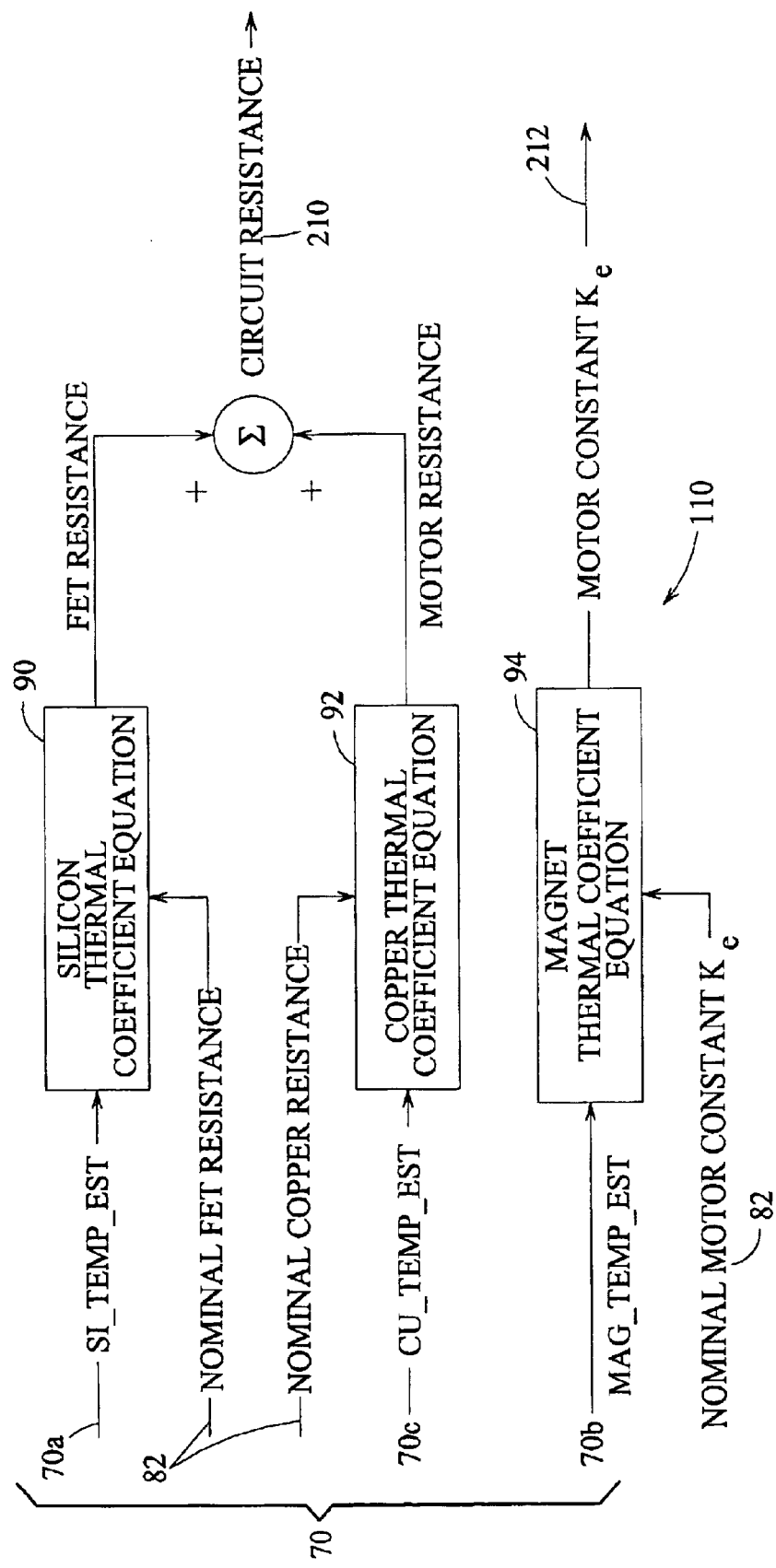
FIG. 10 is a block diagram representing the use of the temperature estimates in parameter calculations.
Figure 11:
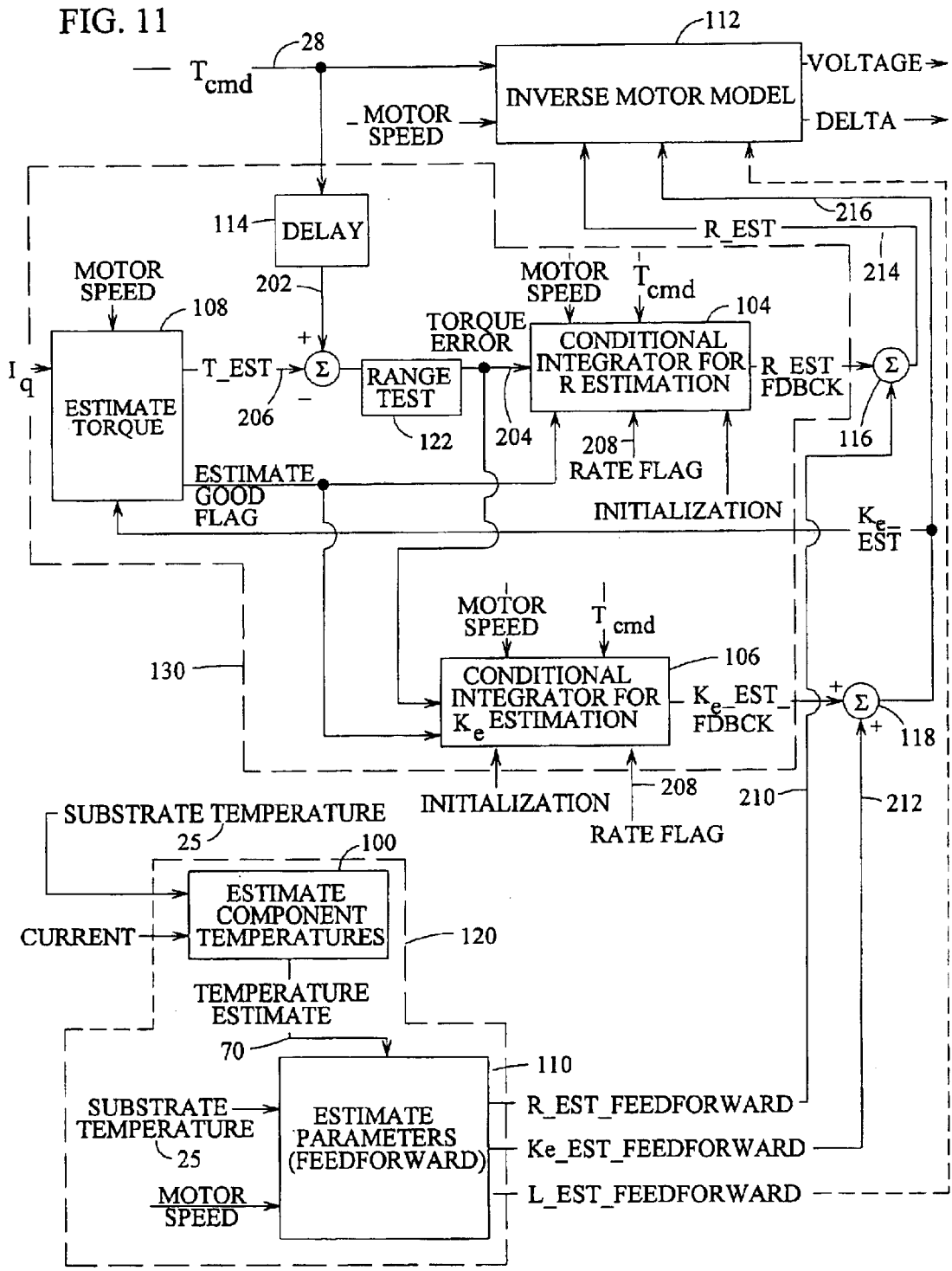
FIG. 11 is a block diagram depicting the combined feedforward/feedback estimation process.

Turning now to FIG. 10, a block diagram depicting a feedforward parameter estimation process 110 employing the abovementioned temperature estimation process(es) 100 is depicted. Deriving accurate temperature estimates of the various motor and system components facilitates the estimation and calculation of motor parameter values and therefrom, determination of the correct operating voltage to command the motor 12 (see also FIG. 11). Once again, in an embodiment, the calculations may be accomplished either by using lookup tables to simplify and expedite processing or by solving the equations. FIG. 10, as well as FIG. 11 illustrate an example of how such temperature estimation data may be processed to calculate the total motor circuit resistance and motor constant and thereafter, the correct motor operating voltage in response to temperature changes. Nominal parameter values 82 (in this instance, for the transistor silicon resistance as well as the motor copper resistance and motor constant $K_e$) are used as inputs, along with the temperature estimates 70, into the corresponding parameter calculation blocks 90, 92, and 94. The equations of all three parameter calculation blocks 90, 92, 94 are of the following form:

$$\text{Actual Parameter Value} = (\text{Nominal Value } @T_{nom})^*(1+\text{Thermal Coefficient}^*(T_{act}-T_{nom})) \tag{16}$$

where $T_{nom}$ is the temperature at which the nominal parameter value is defined, Thermal Coefficient is the thermal coefficient of the thermally sensitive material of the parameter being calculated (such as the temperature coefficient of resistivity of copper for the motor resistance), and $T_{act}$ is the actual temperature of the material.

It should, however, be noted that the diagram in FIG. 10 depicts three temperature estimates 70a 70b, and 70c (e.g., silicon, copper, and magnet) used in the parameter calculation, are employed. However, it should be evident that the same technique shown in FIG. 10 may logically be applied using any number of temperature estimates.

Enhanced Feedback Parameter Estimation

Feedforward parameter estimation provides an open loop means of approximating the variations in the motor parameters with temperature. Even with such estimation, because the models are not exactly correct, there will still be an error in the temperature estimates. Moreover, life degradation of the machine parameter values cannot be accounted for and compensated. Finally, the parameter changes due to build variation may only be addressed utilizing 100% part evaluation and calibration, which would require additional time and cost to manufacturing. A closed loop (feedback) approach utilizing error integrators allows for compensation of the slowly changing build and life variations. Errors in temperature estimates resulting in parameter estimation errors may also be compensated.

An exemplary embodiment includes one or more conditional integrators for accumulating and correcting both motor circuit resistance R errors and motor constant $K_e$ errors. The integration conditions are determined by the accuracy of the error signals for each integrator. In addition, error integration for R estimation occurs in the low velocity/high torque command region of motor operation and error integration for $K_e$ occurs in a high velocity/low torque command region. This is due to the fact that at low velocities, the resistance error signal equation is more accurate, while at high velocities the $K_e$ error signal equation is more accurate.

Referring now to FIG. 11 depicting combined feedforward methodology 120 and feedback methodology 130 for parameter estimation as may be implemented and executed by the controller 18. Generally, in a voltage control scheme, a torque command signal $T_{CMD}$ 28, which identifies the desired torque command, is utilized along with the current motor velocity ω to generate voltage and phase advance angle δ commands to the motor. Moreover, the torque command signal $T_{CMD}$ 28 may include envelope and magnitude limiting, or other such processing and the like, to control the signal characteristics. Controller 18 may also include such processing, the motor control and estimation processing as may be present in an inverse motor model 112 may also take advantage of estimates of motor parameters such as resistance R, inductance L, and motor constant $K_e$.

The embodiment also includes conditional integrators 104 and 106 (e.g. they integrate their inputs only under predefined conditions) for correcting both motor circuit resistance R (104) and motor constant $K_e$ (106). The conditional integrators 104 and 106 are responsive to a torque error signal 204 generated via the comparison of an estimated torque 206 generated at 108 and a time shifted version of the $T_{CMD}$ 28 denoted the delayed torque command 202. It will be appreciated, that by noting that the torque producing current $I_q$ is directly proportional to the torque, either of the two analogous quantities may be employed in this approach. Hereafter, the torque and torque current will be treated equivalently.

The process, estimate torque 108 utilizes a measurement representing the torque producing current, or $I_q$, of the motor (also referred to as the "real", "quadrature", or "torque" component of the motor current vector) and the motor velocity ω as inputs. Appropriate scaling is applied to facilitate comparison of the measured torque producing current $I_q$ to the expected value determined from the torque command $T_{CMD}$ 28. An appropriate delay depicted at 114 between the $T_{CMD}$ 28 and the comparison operation is applied to ensure that the measured $I_q$ is time coherent with the $T_{CMD}$ 28 to which it is being compared thereby generating a delayed torque command 202. The most recent estimated value of the combined feedforward and feedback motor constant estimate $K_{eEST}$ is employed used in the scaling process. Since torque is equal to $K_e*I_q$, either the delayed torque command 202 may be divided by $K_{eEST}$ to create a commanded torque current variable to compare to the computed $I_q$, conversely, $I_q$ may be multiplied by $K_{eEST}$ to create a computed torque estimate $T_{EST}$ 206 and compared to the delayed torque command 202. The latter is depicted in FIG. 11. The torque error signal 204 generated by the comparison is range checked at limiting process 122 and ignored if the torque error signal 204 exceeds a selected limit. Otherwise, the torque error signal 204 is supplied to the resistance conditional integrator 104. Similarly, the torque error signal 204 is supplied to the motor constant $K_e$ conditional integrator 106.

An additional output of the estimate torque process 108 is a signal which represents that the measured value of $I_q$ is valid, or within selected error bounds. The operation of the conditional integrators may be interlocked as a function of this validity condition to ensure that the integrators only operate under selected conditions. For instance, the $I_q$ measurement input to the estimate torque process 108 may be unavailable or of lesser accuracy. The conditional integrators 104 and 106 are employed to generate feedback corrections for resistance R and motor constant $K_e$ responsive to the torque error signal 204. The integration conditions are determined by the accuracy of the torque error signal 204 applied to each integrator. In addition, error integration for resistance estimation occurs in the low velocity/high torque command region of motor operation, while the error integration for motor constant $K_e$ occurs in a high velocity/low torque command region. It will be appreciated that at low velocities, the resistance error signal equation (e.g., equation 23) is more accurate; while at high velocities the $K_e$ error signal equation (e.g., equation 25) is more accurate.

The conditional integrators 104 and 106 themselves also operate as a function of numerous input signals to establish the selected integrating conditions. In an exemplary embodiment, motor velocity ω, motor torque command $T_{CMD}$ 28, a rate flag 208, and the estimate good flag as discussed earlier are employed to further define the desired integration envelopes. It is noteworthy to appreciate that motor velocity ω is utilized to enhance the accuracy of the error equations being used for the estimation. As described herein above, the feedback compensation equations, exhibit enhanced accuracy in different velocity ranges for the numerous motor parameters. On the other hand, as stated earlier, the resistance estimate in equation (23) approaches infinity at $I_q=0$. Therefore, low torque commands need to be excluded from the integration component of the estimation for resistance. Similarly, the $K_e$ estimate in equation (25) approaches infinity at ω=0, and thus the motor stall and/or low velocity condition should be excluded from the $K_e$ integration. In addition, it is noteworthy to recognize that the resistance error estimate is more accurate for low velocities and the motor constant estimate is more accurate for low torques.

The estimate good flag provides an interlock on the estimate computation for those operating conditions when the torque estimate from the estimate torque process 108 may not be valid. For example, under certain operating conditions the algorithm employed to ascertain the torque current may experience degradation in accuracy or may not be deterministic. One such condition employed to invalidate the torque estimate is when the motor 12 is operating in quadrant II or IV, that is, when the torque command and velocity ω are in opposite directions. Such conditions occur when there are torque and direction reversals.

In yet another embodiment, the conditional integrators may also be a function of additional conditions and criteria. For example, additional constraints may be employed upon the integrations. In this embodiment, a rate flag is also employed to identify conditions when the spectral content of the torque command is undesirable and thus the integration should be disabled. In this instance, a rate flag 208 is employed by each of the conditional integrators 104 and 106 as an interlock on the feedback estimate computation under transient conditions. The rate flag 208 indicates that the spectral content of the torque command $T_{CMD}$ 28 is below a selected frequency threshold. An interlock of this nature is desirable to avoid including in the estimate computation contributions to the torque error which are resultant from sudden but short duration torque commands by the operator.

Continuing with FIG. 11, it is noteworthy to appreciate that the integration envelope boundaries may be implemented with a variety of boundary conditions. For example, "hard" boundaries, which are exemplified by the conditional integrator(s) 104 and 106 being either "on" and running or "off" when on either side of the boundary respectively. Conversely, "soft" boundaries, where the integrator gain is gradually reduced when crossing the boundary from the "on" or active side to the "off" or inactive side and gradually increased back to its nominal value when crossing the boundary from the "off" side to the "on" side. A "hard" boundary may be easier to implement but a "soft" boundary may allow the integration window to grow slightly. In an embodiment, a "hard" boundary may be employed to simplify implementation requirements.

Having reviewed the interfaces to, and operation of, the conditional integrators 104 and 106, attention may now be given to some details of operation of the remainder of the feedback parameter estimation as depicted in FIG. 11. It may be noted that the parameters of interest usually vary relatively slowly over time. For example, the temperature dependent variation and the life variation of the parameters may exhibit time constants on the order of minutes, days if not even years. Therefore, the conditional integrators 104 and 106 may be configured as desired to exhibit relatively slow response times, or low gains. Setting the gains too high or the response too fast, for example, may inadvertently cause the conditional integrators 104 and 106 to initiate correction of parameters during higher frequency commanded torques as might be experienced under rapid or aggressive steering maneuvers. Because the normal delay between commanded torque $T_{CMD}$ 28 and actual torque (as supplied from the process estimate torque 108) becomes less predictable in this case, the delayed $T_{CMD}$ 202 and $T_{EST}$ 206 may not be time coherent (matched in time). However, by maintaining the conditional integrator gains lower and the response characteristics of the conditional integrator slower, overall response to erroneous torque error signals, if any, are limited and unable to adversely affect the outputs of the conditional integrators 104 and 106, or the motor parameter estimates. Once again, this may be accomplished by disabling the conditional integrators 104 and 106 under selected conditions to ensure that the effect on the parameter estimates will be minimized. The rate flag disclosed in the above mentioned embodiment may be employed to address this requirement in a manner similar to that described earlier.

Another important consideration for the practical implementation employing the conditional integrators 104 and 106 is initialization. It is well understood that because of the nature of an integrating function, controlling the initial conditions is very important. This is the case because any error in the initial conditions may only be eliminated via the gain and at the integrating rate specified. Therefore, in the instant case where the desired response is purposefully maintained slow to accommodate system characteristics, the initial error may take significant time to be completely eradicated.

Like the estimation filters 40, 50, and 60 discussed earlier, initialization of the conditional integrators 104 and 106 presents unique circumstances for consideration. In another embodiment, the conditional integrators 104 and 106 may be initialized to a nominal parameter value with each initialization or vehicle starting condition (e.g., with each ignition cycle or power on cycle in an automobile). However, employing this approach once again means that at key on (initial power turn on) the parameter estimate applied to the inverse motor model 112 will now start at the nominal parameter value, and therefore once again not include any information about the parameter estimates "learned" during previous operational cycles. Considering, as stated earlier, the conditional integrators 104 and 106 are interlocked at motor stall (e.g. ω=0), this again means that for the first steering maneuver (first commanded torque $T_{CMD}$ 28) the operator performs, a significant, albeit smaller than the abovementioned embodiment, error may be present.

In yet another embodiment, the output of each conditional integrator 104 and 106 may be saved in a storage location at the end of each ignition/operational cycle. It is noteworthy to recognize that at the end of each ignition cycle, the output of each conditional integrator 104 and 106 represents the parameter estimate correction needed to overcome the build and life errors and variations. Furthermore, it should be noted and apparent that from one operational cycle to the next, the parameter variation dependent upon build variations will not have changed significantly and therefore, the build variation error correction required is zero. Likewise, the life variation correction from one operational cycle (e.g., each power application to the motor control system 10) to the next is minimal if not negligible. Therefore, in an embodiment, the output of the conditional integrators 104 and 106 may be compared with values from previous operational cycles and saved as a correction only if they differ from the saved values by some selected margin. As such, only significant differences in the response of the conditional integrators 104 and 106 between operational cycles will be saved, thereby reducing processing effort and impact on storage utilization.

To appreciate and understand the accuracy ranges for the estimates, and the operation of the feedback motor parameter estimates, it is helpful to review the theoretical equations for each and their generation. The motor resistance R and motor constant $K_e$ estimates are based upon a simplification of the motor torque and voltage equations.

The equation for calculating the actual motor circuit resistance is derived from the motor torque and voltage equations in the following manner. The motor torque $T_m$ is equal to:

$$T_m = \frac{K_e}{R} \frac{V\left(\cos(\delta) + \left(\frac{\omega_e L}{R}\right)\sin(\delta)\right) - K_e \omega_e \frac{2}{N_p}}{1 + \left(\frac{\omega_e L}{R}\right)^2} \tag{17}$$

where R, $K_e$, and L are all the actual motor circuit parameters of resistance, motor constant and inductance respectively, $\omega_e$ is the electrical motor velocity (i.e. the rotational velocity times the number of poles divided by 2, $\omega_m N_p/2$), $N_p$ is the number of motor poles and δ is the actual motor phase advance angle. V is the applied motor voltage, which is derived using estimates of the parameters.

The concept is as follows: Equation (17) for the motor torque is divided by the actual value of the motor constant $K_e$ which gives an equation for the torque producing component of the total motor current, $I_q$ as shown in equation (18).

$$I_q = \frac{V \cdot \left[\cos(\delta) + \left(\omega_e \cdot \frac{L}{R}\right) \cdot \sin(\delta)\right] - 2 \cdot \omega_e \cdot \frac{K_e}{N_p}}{R \cdot \left[1 + \left(\omega_e \cdot \frac{L}{R}\right)^2\right]} \tag{18}$$

Equation (18) is then solved for the actual resistance R, with the exception that the L/R terms are still on the right hand side of the equation yielding equation (19).

$$R = \frac{V \cdot \left[\cos(\delta) + \left(\omega_e \frac{L}{R}\right) \cdot \sin(\delta)\right] - 2 \cdot \omega_e \cdot \frac{K_e}{N_p}}{I_q \cdot \left[1 + \left(\omega_e \cdot \frac{L}{R}\right)^2\right]} \quad (19)$$

The equation for commanded motor voltage V is derived from equation (17) and using estimated motor parameters yields equation (20), which is subsequently substituted into equation (19), thereby resulting in a new equation for the resistance R, equation (21).

$$V = \frac{\dfrac{2 \cdot \omega_e \cdot K_{eEST}}{N_p} + T_{cmd} \cdot \dfrac{R_{EST}}{K_{eEST}}\left[1 + \left(\omega_e \cdot \dfrac{L_{EST}}{R_{EST}}\right)^2\right]}{\cos(\delta) + \left(\omega_e \cdot \dfrac{L_{EST}}{R_{EST}}\right) \cdot \sin(\delta)} \quad (20)$$

$$R = \frac{\dfrac{\dfrac{2\omega_e K_{eEST}}{N_p} + T_{cmd} \dfrac{R_{EST}}{K_{eEST}}\left[1 + \left(\omega_e \dfrac{L_{EST}}{R_{EST}}\right)^2\right]}{\cos(\delta) + \left(\omega_e \dfrac{L_{EST}}{R_{EST}}\right) \cdot \sin(\delta)} \left[\cos(\delta) + \left(\omega_e \dfrac{L}{R}\right) \cdot \sin(\delta)\right] - 2\omega_e \dfrac{K_e}{N_p}}{I_q \cdot \left[1 + \left(\omega_e \cdot \dfrac{L}{R}\right)^2\right]} \quad (21)$$

Hereafter, certain assumptions are applied to aid simplification of equation (21). First, it is noteworthy that if the error between the estimated values $R_{EST}$ and $L_{EST}$ and the actual values for R and L is small, and further, if the motor velocity $\omega_m$ low (such that phase advance angle $\delta$ is also small), then, the phase advance terms (terms of the form $\cos(\delta)+\omega_e L/R^*\sin(\delta)$) of equation (21) may be ignored and canceled. The resultant is equation (22) as shown. Second, assuming that the error between the estimated value $K_{eEST}$ and $K_e$ is small and again that the motor velocity $\omega_m$ is low allows the first term in the numerator to be neglected and cancelled.

$$R = \frac{2 \cdot \omega_e \cdot \dfrac{K_{eEST} - K_e}{N_p} + T_{cmd} \cdot \dfrac{R_{EST}}{K_{eEST}} \cdot \left[1 + \left(\omega_e \cdot \dfrac{L_{EST}}{R_{EST}}\right)^2\right]}{I_q \cdot \left[1 + \left(\omega_e \cdot \dfrac{L}{R}\right)^2\right]} \quad (22)$$

Finally, the numerator and denominator terms of the form $1+(\omega_e L_{EST}/R_{EST})^2$ may be cancelled based on the first assumption that the errors between the estimated values $R_{EST}$ and $L_{EST}$ and the actual values for R and L is small. This results in a relatively simple equation for the actual value of R as follows:

$$R = T_{CMD}\frac{R_{EST}}{K_{eEST}I_q} \quad (23)$$

To determine a "measured" value of $K_e$ from the available signals, the following vector equation for motor current can be used. V represents the applied motor voltage, E represents the motor BEMF, or back electromotive force, I represents the motor current, $\omega_m$ is the motor mechanical velocity, and Z represents the motor circuit impedance.

$$\hat{I} = \frac{\hat{V} - \hat{E}}{\hat{Z}} \quad (24)$$

-continued $$\hat{E} = \hat{V} - \hat{I}\hat{Z}$$

$$\hat{E} = K_e \omega_m$$

$$K_e = \frac{\hat{V} - \hat{I}\hat{Z}}{\omega_m}$$

Since the left side of the equation (24) is real, the right side using well known principles can be written in terms of its real part only.

$$K_e = \frac{V\cos(\delta) - I_q R}{\omega_m} \quad (25)$$

It should be noted that all of the values on the right side of the equation are available either as software parameters or software inputs. By subtracting this "measured" value of $K_e$ from the $K_e$ estimate, a $K_e$ error signal can be developed and used for gradually integrating out the error in the estimate. Also noteworthy is to recognize that as motor velocities approach zero velocity, this equation becomes undefined and should not be used. Moreover, under conditions where the imaginary part of the motor current is nonzero the equation is not as accurate.

It may seem as though equation (23) could be solved directly for R since all the parameters on the right hand side of the equation are readily available. However, it is noteworthy to realize that $I_q$ may realistically not always be available or accurate, especially at start up. Further, the assumptions used to derive the equations initially, were characterized as valid primarily at low velocities, thus dictating that equation (23) is only valid at low velocities. Therefore, the approach disclosed in this embodiment should preferably, be employed under conditions where the resultant of the integration can either be combined with a constant nominal value for the resistance R, or more substantially, as in an exemplary embodiment disclosed later herein, an estimate for R derived from the feedforward compensation as described in previous embodiments.

An alternate approach to computing an equation for $K_e$ estimation may be employed. Employing the same technique utilized above to develop an equation for the estimate for R, an equation to estimate $K_e$ may be developed. Referring once again to equation (18), the equation can be solved for $K_e$ to yield equation (26).

$$K_e = \frac{V \cdot \left[\cos(\delta) + \left(\omega_e \cdot \dfrac{L}{R}\right)\sin(\delta)\right] - I_q \cdot R \cdot \left[1 + \left(\omega_e \cdot \dfrac{L}{R}\right)^2\right]}{2 \cdot \dfrac{\omega_e}{N_p}} \quad (26)$$

Again in a similar fashion, utilizing equation (20) for the voltage and then substituting into equation (26), equation (27) for $K_e$ is generated.

$$Ke = \frac{\dfrac{\dfrac{2\omega_e \dfrac{K_{eEST}}{Np} + T_{cmd}\dfrac{R_{EST}}{K_{eEST}}\left[1+\left(\omega_e\dfrac{L_{EST}}{R_{EST}}\right)^2\right]}{\cos(\delta)+\left(\omega_e\dfrac{L_{EST}}{R_{EST}}\right)\sin(\delta)}\left[\cos(\delta)+\left(\omega_e\dfrac{L}{R}\right)\sin(\delta)\right] - I_q R\left[1+\left(\omega_e\dfrac{L}{R}\right)^2\right]}}{2\dfrac{\omega_e}{Np}} \quad (27)$$

Once again, applying the assumptions and simplifications employed above to solve for R, a simplified equation for $K_e$ may be developed in terms of known parameters. That is, because the errors in R and L are small, allows the phase advance terms to cancel. Additional simplification of the remaining terms yields equation (28) shown below.

$$K_e = K_{eEST} + \frac{N_P \cdot R_{EST}}{2 \cdot \omega_e} \cdot \left(\frac{T_{cmd}}{K_{eEST}} - I_q\right) \cdot \left[1 + \left(\omega_e \frac{L_{EST}}{R_{EST}}\right)^2\right] \quad (28)$$

Although not as simple as the estimation equation for R (equation 23), the error between $K_e$ and $K_{eEST}$ is still a function of the difference equation $T_{cmd}/K_{eEST}$ minus $I_q$. Two other velocity dependent terms act as a "gain" term for the difference equation. Observation indicates that this "gain" term approaches infinity at zero velocity (e.g., $\omega_e=0$), then the "gain" term reduces to a minimum at motor operation mid-range velocities, and then increases again at high velocities. An example of the "gain" term versus velocity in shown in FIG. 12. Therefore, it may be apparent then that the difference equation of equation (28) provides an indeterminate estimate for $K_e$ at low or zero velocity as stated earlier, and yet an improved indication of the $K_e$ estimate error at high velocities where the "gain" term is larger. Therefore the best range to estimate $K_e$ would be at high velocities.

It is easy to see from equation (23) for R that if $T_{CMD}$ is equal to $K_{eEST} I_q$ then R will be equal to $R_{EST}$. If $T_{CMD}$ is larger than $K_{eEST} I_q$ then $R_{EST}$ is too small, and vice versa. Therefore, the error signal for the conditional integrators 104 and 106 may readily be computed by subtracting $K_{eEST} I_q$ from $T_{CMD}$ (or equivalently $T_{CMD}/K_{eEST}$ minus $I_q$). Integration should then take place only at low motor velocities where $\delta$ is small and at values of $I_q$ greater than zero, since at $I_q=0$ the above equation for R goes to infinity and is not valid.

Figure 12:
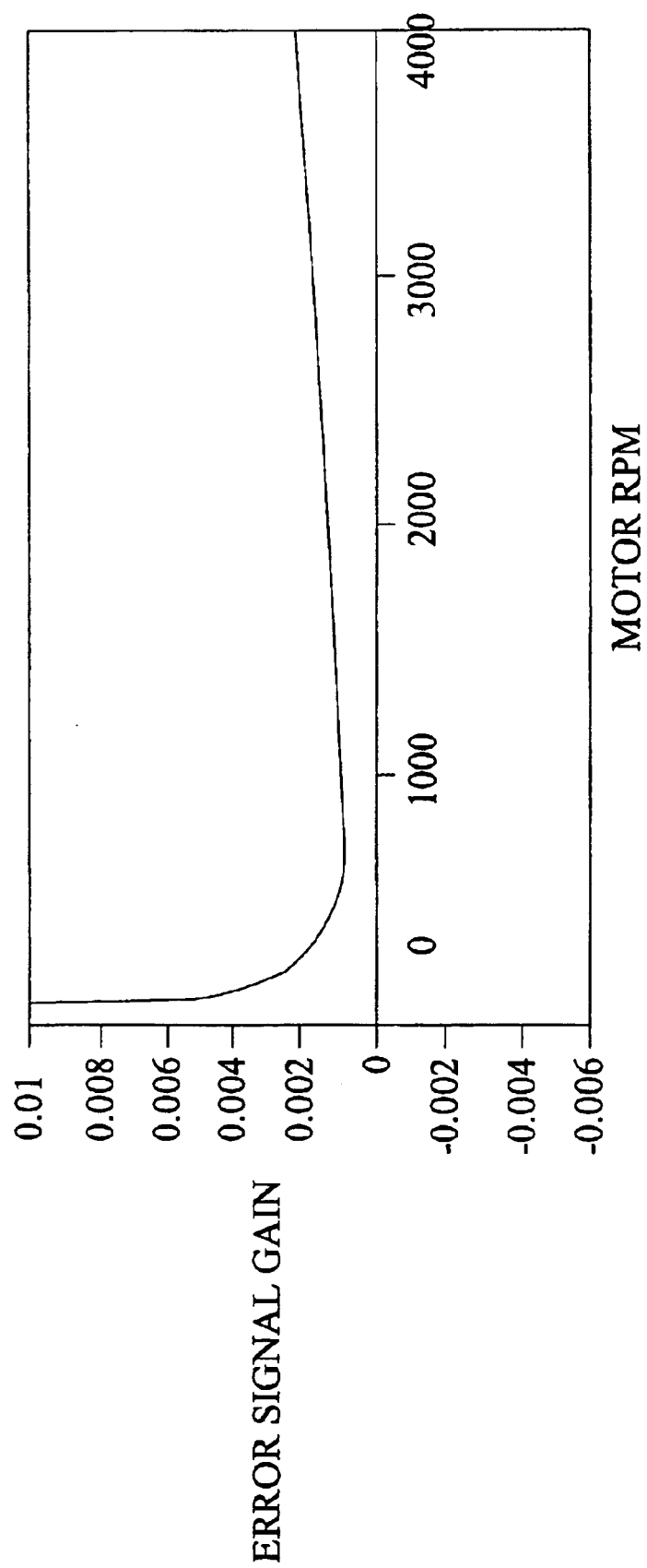
FIG. 12 depicts a $K_e$ estimator error signal gain as a function of motor velocity.

Returning to equation (25) and the computation of $K_e$, in this instance, the error between $K_e$ and $K_{eEST}$ is also a function of the difference equation $T_{CMD}/K_{eEST}$ minus $I_q$. The two other velocity dependent terms provide scaling for the difference equation. It is noteworthy to recognize that these scaling terms approach infinity at zero velocity, then reduce to a minimum for mid-range velocities of motor operation, and then increase again at high velocities. Therefore, the difference equation will then be a better indicator of the $K_e$ estimate error at high velocities where the gain is larger. Therefore, the best range to integrate for $K_e$ would be at high velocities and avoiding the anomaly at low or zero velocity. FIG. 12 depicts a $K_e$ estimator error signal gain as a function of motor velocity.

Therefore, by starting with the explicit equations for the parameters and applying several educated assumptions and constraints, simple equations for estimating the parameters may be derived. The resultant parameter estimates are proportional to the error between the commanded motor torque and the actual or measured motor torque. This approach facilitates employing a simple error integration technique to compute corrections for the motor parameters. Once again, it is noteworthy to appreciate that the integration process should be constrained to the motor operational regions where the simplified equations are valid due to the abovementioned assumptions and constraints.

Yet another embodiment, employs another enhancement to feedback parameter estimation by establishing conditions under which the parameter estimation should be halted and not performed. Such conditions may exist for a variety of reasons particularly those associated with conditions under which the assumptions employed to establish the parameter estimation equations may no longer be valid. One such condition may be dynamic operating conditions for the motor 12, for example, dynamic torque and current as may be induced by more aggressive operator inputs. Under such dynamic conditions, for example, high torque or current or high rate motor commands, the parameter estimation algorithms disclosed above may update existing estimations for motor parameters with estimates which are consequently inaccurate as a result of the dynamic conditions. Therefore, an exemplary embodiment provides a means of selectively enabling the motor parameter estimation as a function of the commanded motor dynamic conditions. Such selective enablement of the estimation process yields a more accurate estimate by avoiding parameter estimation responses to conditions that produce undesirable results.

The inverse motor model depicted at 112 in FIG. 11 employed for motor control is effectively a steady state inverse of the motor equations of operation providing voltage to be applied to the motor 12 as a function of motor velocity and desired output torque. It will be appreciated that utilizing this steady state model, for example, in motor control applications for vehicle steering, produces acceptable results while avoiding undesirable driver feel anomalies associated with the dynamic characteristics of the system 10. This has been the case because the motor time constant and dynamic responses are negligible when compared to the mechanical time constant of the vehicle steering mechanisms. In other words and more particularly, the lag and dynamics between the commanded current in the steady-state inverse motor model and the torque produced by the motor are not felt by the driver and are thus, transparent to the driver.

In an exemplary embodiment and referring once again to FIG. 11, to facilitate motor parameter estimation a comparison and error computation between commanded torque and motor torque is employed, thereby, generating a torque error. Even when ideal motor parameters are considered, such an error will persist, particularly under dynamic conditions. Moreover, because the torque error is utilized to correct and compensate the motor parameters as disclosed herein, such a torque error will effectively "correct" the motor parameters from more accurate or ideal values to less accurate, non-ideal values under certain conditions. This "correction" away from more accurate values is characteristic of the parameter estimation process, which is preferably avoided. Therefore, it will be evident that one way to prevent "improper" correction is to disable the parameter estimation of the conditional integrators 104 and 106 during selected dynamic conditions. The rate flag 208 discussed in earlier embodiments is an implementation, which addresses this disabling of the conditional integrators 104 and 106 under selected conditions. It will be appreciated that while the disclosed embodiment pertains an enhancement for parameter estimation employing a determination of a torque error resultant from a difference between commanded and actual torque, analogous comparisons may be employed utilizing current. In fact, under certain conditions it may be advantageous in implementation to employ current rather than torque as the subject compared parameter.

An exemplary embodiment presents method and system for preventing undesirable correction of motor parameter estimation under dynamic operating conditions. In the system 10 motor 12 operates under true steady state conditions (no dynamics) if all orders of the motor torque and motor velocity derivatives are zero. It will be appreciated that over a short duration of time and neglecting highly dynamic conditions, the motor velocity $\omega_m$ exhibits little change due to physical constraints and properties (e.g., mass, inertia, and the like). Hence, it may be assumed that all orders of derivatives of motor velocity are zero during one sample period. Moreover, the velocity of the motor remains relatively constant under operating conditions where the torque is not rapidly changing as well. Therefore, the characteristics of the motor torque often provide a good indication of the characteristics of the velocity of the motor. However, significant dynamics may exist when the commanded torque exhibits rapid changes. In addition, the greater the rate of change of the commanded torque, the greater the resulting motor dynamics. The first derivative of the motor torque may be approximated by the change of commanded torque over a fixed period of time, for example, one sample period, or a specified motor torque change divided by the associated duration of time for that torque change. It will be appreciated that there are numerous methodologies for ascertaining the rate of change of motor torque or motor current. The two given here are exemplary and illustrative and are not necessarily inclusive of other potential means of determining a derivative. It will also be appreciated that, in practice, it is often difficult to obtain a true measurement or estimate of higher order derivatives utilizing the abovementioned or similar methods. Because of noise amplification difficulties and mathematical anomalies, such methodologies are limited to certain characteristics of data and applications. Ideally, it would be preferred to include all the higher order derivatives of the motor current to facilitate the determination and characteristics of the motor dynamics, but nonetheless, the rate of change of commanded torque and therefore the current presents a useful estimate of the motor dynamics.

Referring once again to FIG. 11, it will be appreciated that the rate of change of commanded current may be calculated as the difference between current commands over a period of time. For instance, the difference between current commands over two consecutive or a selected number of controller cycles. If the rate of change of current command exceeds a selected threshold value, the parameter estimation may be disabled (no integration by the conditional integrators 104 and 106 (FIG. 11) during that time period). If this rate is less than the threshold, parameter estimation is allowed to integrate the error. In an exemplary embodiment, a threshold value of 2 Amperes (A) over a 2 millisecond duration was employed and found to provide more efficient conditional integrators.

It should be noted that the maximum gains of the conditional integrators 104 and 106 may therefore be determined by the maximum acceptable wandering fluctuations of the estimated parameters R and $K_e$. It is further noteworthy to appreciate that by restricting the parameter estimation to operate under the threshold as disclosed herein, to a finite extent, an increase in the gain of the conditional integrators 104 and 106 may be achieved thereby improving the response characteristics of the conditional integrators 104 and 106 for the parameter estimation.

Combined Feedback and Feedforward Parameter Estimation

Another exemplary embodiment contemplates an enhancement of the processes of the feedback methodology 130 for parameter estimation embodiments discussed earlier combined with the processes of the feedforward methodology 120 for parameter estimation also discussed earlier. Such a combination of feedback methodology 130 combined with feedforward methodology 120 for parameter estimation captures the advantages of both methodologies while minimizing the disadvantages and limitations of either methodology when implemented alone. FIG. 11 depicts a diagram outlining the processes employed. It is noted that feedback methodologies are generally closed loop and provide accurate control of a parameter or system at the expense of mandating an accurate sensing method or apparatus and poor transient response or stability. Moreover, feedback systems often require additional processing time to compute the desired corrections. Conversely, feedforward methodologies are generally open loop and do not require a sensor measurement of the parameter of interest. Additionally, a feedforward methodology exhibits excellent transient response characteristics usually at the expense of accuracy of response. Therefore, a combination of the feedback methodology with the feedforward methodology provides the increased accuracy attributable to feedback with the dynamic response attributable to feedforward.

A description of the processes employed to facilitate the feedback methodology 130 and the feedforward methodology 120 has been provided earlier and will not be repeated here to avoid redundancy. Therefore, it should be understood that a reference to feedback includes the full description and disclosure of the abovementioned feedback parameter estimation methodology. Furthermore, reference to feedforward includes the full description and disclosure of the abovementioned temperature estimation and feedforward parameter estimation methodology. Further descriptions provided herein are intended to expound the capabilities either the feedback or feedforward parameter estimation or the combination thereof.

Having reviewed the interfaces to, and operation of, the conditional integrators 104 and 106, attention may now be given to some details of operation of the remainder of the combined feedforward and feedback parameter estimation as depicted in FIG. 11. Turning now to the feedback methodology 130, it may be noted that the parameters of interest usually vary relatively slowly over time. For example, the life variation of the parameters may exhibit time constants on the order of minutes, days if not even years. Moreover, the build variations tend to be more random in nature from one unit to another. Therefore, the conditional integrators 104 and 106 may be configured as desired to exhibit relatively slow response times, or low gains. Setting the gains too high or the response too fast, for example, may inadvertently cause the conditional integrators 104 and 106 to initiate correction of parameters during higher frequency commanded torques as might be experienced under rapid or aggressive steering maneuvers. Because the normal delay between commanded torque $T_{CMD}$ 28 and actual torque (as supplied from the process estimate torque 108) becomes less predictable in this case, the delayed $T_{CMD}$ 202 and $T_{EST}$ may not be time coherent (matched in time) possibly resulting in the generation of erroneous error signals, albeit briefly. However, by maintaining the conditional integrator gains lower and the response slower any erroneous signals generated are limited and unable to adversely affect the outputs of the conditional integrators 104 and 106, or the motor parameter estimates. Once again, this may be accomplished by disabling the conditional integrators 104 and 106 under selected conditions to ensure that the effect on the parameter estimates will be minimized. The rate flag disclosed in the above mentioned embodiment may be employed to address this requirement in a manner similar to that described earlier.

Returning once again to FIG. 11, the feedforward methodology 130 comprising the feedforward parameter estimation 110 as well as the component temperatures estimation process 100 has been disclosed earlier, and together, computes a temperature dependent feedforward parameter estimate for both the resistance R and the motor constant $K_e$. The feedback methodology 130 compute long term slowly varying corrections to the parameter estimates to address build and life variations. In an embodiment, the output of the conditional integrators 104 and 106 respectively, is combined at summers 116 and 118 respectively with the output of the feedforward parameter estimation for resistance estimate 210 and motor constant estimate 212 described earlier yielding combined parameter estimates 214 and 216 for resistance and motor constant respectively. The combined parameter estimates 214 and 216 update continuously with temperature (feedforward), and as needed to correct for build or life variations (feedback). The result of these combinations is the final motor parameter (R, $K_e$) estimate, which is applied to the inverse motor model 112 and used to calculate the appropriate voltage and phase commands for the motor to achieve the desired torque.

In an embodiment of the combined feedback methodology 130 and feedforward methodology 120, once again initialization is paramount. The combined approach yields significant advantages not readily achieved with either the feedback methodology 130 or feedforward methodology 120 alone. Turning to the initialization of the conditional integrators, in an exemplary embodiment of the combined processes, the conditional integrators 104 and 106 could simply be initialized to a zero output with each vehicle starting condition as disclosed earlier. However, employing this approach means that at key on (initial power turn on) the combined parameter estimate applied to the inverse motor model 112 will equal the feedforward estimate only from the feedforward parameter estimate process 110. While this approach may be adequate for some applications, once again, it does not take advantage of the information "learned" about the build and life variations of the parameters.

In yet another embodiment, similar to that disclosed earlier, the output of each conditional integrator 104 and 106 may be saved in a storage location at the end of each ignition/operational cycle. It is noteworthy to recognize that at the end of each ignition cycle, the output of each conditional integrator 104 and 106 represents the parameter estimate correction needed to overcome the build, life, and feedforward correction error variations. Furthermore, it should be noted and apparent that from one operational cycle to the next, the parameter variation dependent upon build variations will not have changed significantly and therefore, the build variation error correction required is zero. Likewise, the life variation correction from one operational cycle (e.g., each power application to the motor control system 10) to the next is minimal if not negligible. Therefore, once again, the contribution to the output of the conditional integrators 104 and 106 due to these variations may be assumed to be constant. As such, the only significant difference in the response of the conditional integrators 104 and 106 between operational cycles may be attributed to errors in the feedforward estimation as a function of temperature.

Fortunately, these types of errors have been previously addressed in an embodiment disclosed, which minimizes their impact. Therefore, the feedforward estimation errors most likely, will be smaller than the build and life variations carried forward. Moreover, employing this approach, the overall initialization error will still be much smaller than if the conditional integrators 104 and 106 were initialized to a zero as the assumed initial output. Employing this technique will reduce the errors due to parameter errors at initialization with the application of power, and will reduce the amount of time for the integrators to approach their final value.

Once again, it is significant to recall and recognize that the feedforward estimation contribution to the motor parameter estimates primarily addresses temperature related changes, while the feedback contribution to the motor parameter estimation primarily addresses long-term variations. Therefore, once the outputs of the conditional integrators 104 and 106 approach final values they should not change significantly until the end of the ignition cycle.

Moreover, looking to the conditions for initialization of the conditional integrator 106 associated with the estimation of $K_e$, it should be recognized that $K_e$ feedback compensation occurs only under certain operational conditions, for example, in disclosed embodiment, high motor/hand wheel velocities. Significantly, some operating conditions are less probable and occur less frequently, for example in an instance employing a vehicle, some drivers may very rarely drive in a manner in which they use high hand wheel velocities. Thus, from a practical position, it would be fruitless to discard the information learned and accumulated about the actual value of $K_e$ from each operational cycle to the next. Thus, to avoid errors in the $K_e$ estimate, which may result in substantial changes in torque output and damping, and possibly stability degradation, the last output values of the conditional integrator (in this instance 106) may be stored, and saved for later use at the end of each operational cycle. More appropriately, at the end of an operational cycle, the last value of the parameter estimate may be compared with a stored value from previous operations and saved only if there has been a significant change in that parameter estimate since the last cycle.

However, the shortcomings described above, due, mainly to the large periods of time where the integrators 104 and 106 are set inactive would remain therefore combining the feedback estimation with the feedforward estimation yields more accurate results. Another advantage of the combining approach described herein is that the accuracy requirements of the feedforward methodology 120 could potentially be relaxed slightly due to the presence of the feedback processes. Thereby, allowing the feedback contribution to the parameter estimates to make up the difference without impacting overall system performance. For example, lower cost temperature sensors may be employed or less complex initialization utilized for the temperature estimation process 100 than may be desired with feedforward parameter estimation alone. It will be further appreciated the while an embodiment disclosing the operation of a pair of conditional integrators responsive to a torque error signal has been described, it will be understood as being exemplary and illustrative only. Other implementations of the same concepts are conceivable. For example, the integrators as described are effectively error accumulators or counters, which accumulate errors at a predetermined rate. Other implementations employing accumulators, counters or other summation methods may readily be employed.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for estimating a parameter of an electric machine, comprising:
   a controller operatively connected to a switching device said switching device operatively connected between said electric machine and a power source, said switching device being coupled to said controller;
   a current sensor operatively connected to and transmitting a current value indicative of a current in said electric machine;
   a temperature sensor operatively connected to and transmitting a temperature signal corresponding to a measured temperature to said controller; and
   said controller executing a parameter estimation process responsive to at least one of; a temperature value responsive to said temperature signal, said current value, and a torque command indicative of a desired torque for said electric machine, wherein a resultant of said parameter estimation process represents a parameter of said electric machine.

2. The system of claim 1 wherein said electric machine comprises an electric motor.

3. The system of claim 1 wherein said parameter comprises at least one of a resistance, an inductance, and a motor constant.

4. The system of claim 1 wherein said current value is representative of a torque current for said electric machine.

5. The system of claim 1 wherein said parameter estimation process comprises a feedback estimation methodology.

6. The system of claim 5 wherein said feedback estimation methodology comprises a closed loop compensation for build and life variations in said parameter of said electric machine.

7. The system of claim 5 further including a velocity sensor disposed to measure a velocity of said electric machine and transmitting a velocity signal to said controller and wherein said feedback estimation methodology is responsive to said torque command signal, said current value, and said velocity signal.

8. The system of claim 5 wherein said feedback estimation methodology includes comparing said torque command signal with an estimated torque in a time coherent manner to generate a torque error.

9. The system of claim 8 wherein said estimated torque is responsive to said current value, a velocity signal, and an earlier parameter estimate.

10. The system of claim 9 wherein said earlier parameter estimate is an earlier motor constant estimate.

11. The system of claim 8 wherein said feedback estimation methodology includes an error accumulator, which generates said parameter estimate in response to said torque error.

12. The system of claim 11 wherein said error accumulator comprises a conditional integrator.

13. The method of claim 11 wherein said error accumulator is initialized to a zero condition.

14. The system of claim 11 wherein said error accumulator is initialized to a nominal value of said parameter.

15. The system of claim 11 wherein said error accumulator is initialized to a saved value of said error accumulator, said saved value updated with a current output of said error accumulator only if said current output of said error accumulator exhibits a change in excess of a selected threshold.

16. The system of claim 5 wherein said controller receives an estimate good flag.

17. The system of claim 16 wherein said estimate good flag is indicative of a validity of said estimated torque.

18. The system of claim 16 wherein said feedback estimation methodology is responsive to said estimate good flag.

19. The system of claim 18 wherein said feedback estimation methodology is disabled when said estimate good flag indicates an invalid estimated torque.

20. The system of claim 5 wherein said controller receives a rate flag.

21. The system of claim 20 wherein said rate flag is indicative of current dynamics beyond a selected threshold.

22. The system of claim 21 wherein said feedback estimation methodology is disabled when said rate flag indicates current dynamics beyond said selected threshold.

23. The system of claim 22 wherein said selected threshold is two amperes over a 2 millisecond duration.

24. The system of claim 1 wherein said temperature sensor comprises a thermistor.

25. The system of claim 1 wherein said controller executes a process for linearizing said temperature signal.

26. The system of claim 25 wherein said linearizing comprises processing via a linearization function mechanism, with said output of said temperature sensor being provided to an input of said linearization function mechanism and an output of said linearization function mechanism being provided to an input of said parameter estimation process.

27. The system of claim 1 wherein said parameter estimation process includes a feedforward estimation methodology responsive to said temperature value.

28. The system of claim 27 wherein said feedforward estimation methodology comprises compensation for temperature variations of said parameter, said compensation employing a temperature coefficient of said parameter.

29. The system of claim 28 wherein said temperature value is responsive to a temperature estimation process.

30. The system of claim 29 wherein said temperature estimation process is implemented by at least one of:
   a silicon temperature estimate filter, responsive to said output from said temperature sensor, said silicon temperature estimate filter having an output corresponding to an estimated temperature of a switching device for said electric machine;
   a magnet temperature estimate filter, responsive to said output from said temperature sensor, said magnet temperature estimate filter having an output corresponding to an estimated temperature of a magnet associated with said electric machine; and
   a copper winding temperature estimate filter responsive to said output from said temperature sensor, said copper winding temperature estimate filter having an output corresponding to an estimated temperature of copper windings associated with said electric machine.

31. The system of claim 30 wherein said silicon temperature estimate filter, said magnet temperature estimate filter, and said copper winding temperature estimate filter are first order, lead-lag filters.

32. The system of claim 31 wherein said silicon temperature estimate filter includes a lag frequency range between about 53 $\mu$Hz and about 320 $\mu$Hz and a lead frequency range between about 53 $\mu$Hz and about 160 $\mu$Hz.

33. The system of claim 31 wherein said magnet temperature estimate filter includes a lag frequency range between about 35 $\mu$Hz and about 80 $\mu$Hz and a lead frequency range between about 53 $\mu$Hz and about 160 $\mu$Hz.

34. The system of claim 31 wherein said copper winding temperature estimate filter includes a lag frequency range between about 35 $\mu$Hz and about 80 $\mu$Hz and a lead frequency range between about 53 $\mu$Hz and about 160 $\mu$Hz.

35. The system of claim 29 further comprising an initialization signal in communication with said controller.

36. The system of claim 35 wherein said initialization signal initializes said temperature estimation process to a substrate temperature corresponding to a linearized output of said temperature sensor.

37. The system of claim 35 wherein said initialization signal initializes said temperature estimation process by continuing to operate following power down until said temperature estimation process approaches an approximately steady state value.

38. The system of claim 35 wherein said initialization signal initializes said temperature estimation process to an initial value based on temperature estimates responsive to another temperature sensor.

39. The system of claim 38 wherein said another temperature sensor is an engine coolant sensor.

40. The system of claim 35 wherein said initialization signal is responsive to a computed duration of temperature change as a function of said another temperature sensor.

41. The system of claim 40 wherein said temperature estimation process computes a temperature $T_x$ in accordance with the equation:

$$T_x = T_a + (T_{x0} - T_a)\left(\frac{T_e - T_a}{T_{e0} - T_a}\right)^{\frac{\tau_e}{\tau_x}}$$

where:
$T_x$ indicates a generalized a temperature for a material,
$T_{x0}$ indicates a generalized initial temperature for $T_x$,
$T_e$ is the engine coolant temperature,
$T_{e0}$ is the hot engine coolant temperature when the ignition is first turned off,
$T_a$ is the ambient temperature,
$\tau_e$ is the cooling time constant for the engine,
$\tau_x$ is the cooling time constant for the material.

42. The system of claim 35 wherein said initialization signal initializes said temperature estimation process to an ambient temperature.

43. The system of claim 35 wherein said initialization signal initializes said temperature estimation process to an ambient temperature estimate.

44. The system of claim 43 wherein said ambient temperature estimate comprises a filter having a cutoff frequency sized to estimate a thermal time constant of said electric machine.

45. The system of claim 44 wherein said ambient temperature estimate comprises a first order, lag filter.

46. The system of claim 45 wherein said first order, lag filter includes a lag frequency range between about 35 $\mu$Hz and about 80 $\mu$Hz.

47. The system of claim 35 wherein said temperature estimation process is implemented by at least one of:
a silicon temperature estimate filter, responsive to said output from said temperature sensor, said silicon temperature estimate filter having an output corresponding to an estimated temperature of a switching device for said electric machine;
a magnet temperature estimate filter, responsive to said output from said temperature sensor, said magnet temperature estimate filter having an output corresponding to an estimated temperature of a magnet associated with said electric machine; and
a copper winding temperature estimate filter responsive to said output from said temperature sensor, said copper winding temperature estimate filter having an output corresponding to an estimated temperature of copper windings associated with said electric machine.

48. The system of claim 47 wherein said silicon temperature estimate filter, said magnet temperature estimate filter, and said copper winding temperature estimate filter are first order, lead-lag filters.

49. The system of claim 48 wherein said silicon temperature estimate filter includes a lag frequency range between about 53 $\mu$Hz and about 320 $\mu$Hz and a lead frequency range between about 53 $\mu$Hz and about 160 $\mu$Hz.

50. The system of claim 48 wherein said magnet temperature estimate filter includes a lag frequency range between about 35 $\mu$Hz and about 80 $\mu$Hz and a lead frequency range between about 53 $\mu$Hz and about 160 $\mu$Hz.

51. The system of claim 48 wherein said copper winding temperature estimate filter includes a lag frequency range between about 35 $\mu$Hz and about 80 $\mu$Hz and a lead frequency range between about 53 $\mu$Hz and about 160 $\mu$Hz.

52. The system of claim 29 further comprising initializing said parameter estimate with an initialization signal said initialization signal in communication with said temperature estimation process.

53. The system of claim 1 wherein said parameter estimation process comprises a combination of a feedback estimation methodology and a feedforward estimation methodology.

54. The system of claim 53 wherein said combination is responsive to at least one of said torque command signal, said current value, said temperature value, and a velocity signal.

55. The system of claim 53 wherein said combination includes summing a parameter estimate correction from a feedback estimation methodology with a parameter estimate from a feedforward estimation methodology.

56. A method for estimating a parameter of an electric machine, comprising:
receiving a torque command signal indicative of a desired torque for said electric machine;
receiving a current value;
receiving a temperature value; and
wherein said estimating is a resultant of a parameter estimation process responsive to at least one of said torque command signal, said current value, and said temperature value, a resultant of said parameter estimation process representing said parameter of said electric machine.

57. The method of claim 56 wherein said electric machine comprises an electric motor.

58. The method of claim 56 wherein said parameter comprises at least one of a resistance, an inductance, and a motor constant.

59. The method of claim 56 wherein said current value is representative of a torque current for said electric machine.

60. The method of claim 56 wherein said parameter estimation process comprises a feedback estimation methodology.

61. The method of claim 60 wherein said feedback estimation methodology comprises a closed loop compensation for build and life variations in said parameter of said electric machine.

62. The method of claim 60 further including obtaining a velocity signal responsive to a velocity of said electric machine, wherein said feedback estimation methodology is responsive to said torque command signal, said current value, and said velocity signal.

63. The method of claim 60 wherein said feedback estimation methodology includes comparing said torque command signal with an estimated torque in a time coherent manner to generate a torque error.

64. The method of claim 63 wherein said estimated torque is responsive to said current value, a velocity signal, and an earlier parameter estimate.

65. The method of claim 64 wherein said earlier parameter estimate is an earlier motor constant estimate.

66. The method of claim 63 wherein said feedback estimation methodology includes an error accumulator, which generates said parameter estimate in response to said torque error.

67. The method of claim 66 wherein said error accumulator comprises a conditional integrator.

68. The method of claim 66 wherein said error accumulator is initialized to a zero condition.

69. The method of claim 66 wherein said error accumulator is initialized to a nominal value of said parameter.

70. The method of claim 66 wherein said error accumulator is initialized to a saved value of said error accumulator, said saved value updated with a current output of said error accumulator only if said current output of said error accumulator exhibits a change in excess of a selected threshold.

71. The method of claim 60 further comprising receiving an estimate good flag.

72. The method of claim 71 wherein said estimate good flag is indicative of a validity of said estimated torque.

73. The method of claim 71 wherein said feedback estimation methodology is responsive to said estimate good flag.

74. The method of claim 73 wherein said feedback estimation methodology is disabled when said estimate good flag indicates an invalid estimated torque.

75. The method of claim 60 further comprising receiving a rate flag.

76. The method of claim 75 wherein said rate flag is indicative of current dynamics beyond a selected threshold.

77. The method of claim 76 wherein said feedback estimation methodology is disabled when said rate flag indicates current dynamics beyond said selected threshold.

78. The method of claim 77 wherein said selected threshold is two amperes over a 2 millisecond duration.

79. The method of claim 56 wherein said temperature value is responsive to a temperature signal from a temperature sensor.

80. The method of claim 79 wherein said temperature sensor comprises a thermistor.

81. The method of claim 79 further comprising linearizing said temperature signal.

82. The method of claim 81 wherein said linearizing comprises processing via a linearization function mechanism interposed between said temperature sensor and said temperature estimation process, with said output of said temperature sensor being connected to an input of said linearization function mechanism and an output of said linearization function mechanism being connected to said input of said temperature estimation process.

83. The method of claim 56 wherein said parameter estimation process includes a feedforward estimation methodology responsive to said temperature value.

84. The method of claim 83 wherein said feedforward estimation methodology comprises compensation for temperature variations of said parameter, said compensation employing a temperature coefficient of said parameter.

85. The method of claim 84 wherein said temperature value is responsive to a temperature estimation process.

86. The method of claim 85 wherein said temperature estimation process further comprises at least one of:

a silicon temperature estimate filter, responsive to said output from said temperature sensor, said silicon temperature estimate filter having an output corresponding to an estimated temperature of a switching device for said electric machine;

a magnet temperature estimate filter, responsive to said output from said temperature sensor, said magnet temperature estimate filter having an output corresponding to an estimated temperature of a magnet associated with said electric machine; and a copper winding temperature estimate filter responsive to said output from said temperature sensor, said copper winding temperature estimate filter having an output corresponding to an estimated temperature of copper windings associated with said electric machine.

87. The method of claim 86 wherein said silicon temperature estimate filter, said magnet temperature estimate filter, and said copper winding temperature estimate filter are first order, lead-lag filters.

88. The method of claim 87 wherein said silicon temperature estimate filter includes a lag frequency range between about 53 $\mu$Hz and about 320 $\mu$Hz and a lead frequency range between about 53 $\mu$Hz and about 160 $\mu$Hz.

89. The method of claim 87 wherein said magnet temperature estimate filter includes a lag frequency range between about 35 $\mu$Hz and about 80 $\mu$Hz and a lead frequency range between about 53 $\mu$Hz and about 160 $\mu$Hz.

90. The method of claim 87 wherein said copper winding temperature estimate filter includes a lag frequency range between about 35 $\mu$Hz and about 80 $\mu$Hz and a lead frequency range between about 53 $\mu$Hz and about 160 $\mu$Hz.

91. The method of claim 85 further comprising initializing said temperature estimation process with an initialization signal.

92. The method of claim 91 wherein said initialization signal initializes said temperature estimation process to a substrate temperature corresponding to a linearized output of said temperature sensor.

93. The method of claim 91 wherein said initialization signal initializes said temperature estimation process by continuing to operate following power down until said temperature estimation process approaches an approximately steady state value.

94. The method of claim 91 wherein said initialization signal initializes said temperature estimation process to an initial value based on temperature estimates responsive to another temperature sensor.

95. The method of claim 94 wherein said another temperature sensor is an engine coolant sensor.

96. The method of claim 94 wherein said initialization signal is responsive to a computed duration of temperature change as a function of said another temperature sensor.

97. The method of claim 96 wherein said temperature estimation process computes a temperature $T_x$ in accordance with the equation:

$$T_x = T_a + (T_{x0} - T_a)\left(\frac{T_e - T_a}{T_{e0} - T_a}\right)^{\frac{\tau_e}{\tau_x}}$$

where:
$T_x$ indicates a generalized a temperature for a material,
$T_{x0}$ indicates a generalized initial temperature for $T_x$,
$T_e$ is the engine coolant temperature,
$T_{e0}$ is the hot engine coolant temperature when the ignition is first turned off,
$T_a$ is the ambient temperature,
$\tau_e$ is the cooling time constant for the engine,
$\tau_x$ is the cooling time constant for the material.

98. The method of claim 91 wherein said initialization signal initializes said temperature estimation process to an ambient temperature.

99. The method of claim 91 wherein said initialization signal initializes said temperature estimation process to an ambient temperature estimate.

100. The method of claim 99 wherein said ambient temperature estimate comprises a filter having a cutoff frequency sized to estimate a thermal time constant of said electric machine.

101. The method of claim 100 wherein said ambient temperature estimate comprises a first order, lag filter.

102. The method of claim 101 wherein said first order, lag filter includes a lag frequency range between about 35 $\mu$Hz and about 80 $\mu$Hz.

103. The method of claim 91 wherein said temperature estimation process comprises at least one of:
a silicon temperature estimate filter, responsive to said output from said temperature sensor, said silicon temperature estimate filter having an output corresponding to an estimated temperature of a switching device for said electric machine;
a magnet temperature estimate filter, responsive to said output from said temperature sensor, said magnet temperature estimate filter having an output corresponding to an estimated temperature of a magnet associated with said electric machine; and
a copper winding temperature estimate filter responsive to said output from said temperature sensor, said copper winding temperature estimate filter having an output corresponding to an estimated temperature of copper windings associated with said electric machine.

104. The method of claim 103 wherein said silicon temperature estimate filter, said magnet temperature estimate filter, and said copper winding temperature estimate filter are first order, lead-lag filters.

105. The method of claim 104 wherein said silicon temperature estimate filter includes a lag frequency range between about 53 $\mu$Hz and about 320 $\mu$Hz and a lead frequency range between about 53 $\mu$Hz and about 160 $\mu$Hz.

106. The method of claim 104 wherein said magnet temperature estimate filter includes a lag frequency range between about 35 $\mu$Hz and about 80 $\mu$Hz and a lead frequency range between about 53 $\mu$Hz and about 160 $\mu$Hz.

107. The method of claim 104 wherein said copper winding temperature estimate filter includes lag frequency range between about 35 $\mu$Hz and about 80 $\mu$Hz and a lead frequency range between about 53 $\mu$Hz and about 160 $\mu$Hz.

108. The method of claim 85 further comprising initializing said parameter estimate with an initialization signal said initialization signal in communication with said temperature estimation process.

109. The method of claim 56 wherein said parameter estimation process comprises a combination of a feedback estimation methodology and a feedforward estimation methodology.

110. The method of claim 109 wherein said combination is responsive to at least one of said torque command signal, said current value, said temperature value, and a velocity signal.

111. The method of claim 109 wherein said combination includes summing a parameter estimate correction from a feedback estimation methodology with a parameter estimate from a feedforward estimation methodology.

112. A storage medium encoded with computer program code; said code including instructions for causing a controller to implement a method for estimating a parameter of an electric machine comprising:
receiving a torque command signal indicative of a desired torque for said electric machine;
receiving a current value;
receiving a temperature value; and
wherein said estimating is a resultant of a parameter estimation process responsive to at least one of said torque command signal, said current value, and said temperature value, a resultant of said parameter estimation process representing said parameter of said electric machine.

113. The storage medium of claim 112 wherein said parameter comprises at least one of a resistance, an inductance, and a motor constant.

114. The storage medium of claim 112 wherein said current value is representative of a torque current for said electric machine.

115. The storage medium of claim 112 wherein said parameter estimation process comprises a feedback estimation methodology.

116. The storage medium of claim 115 wherein said feedback estimation methodology comprises a closed loop compensation for build and life variations in said parameter of said electric machine.

117. The storage medium of claim 115 further including a velocity signal responsive to a velocity of said electric machine, wherein said feedback estimation methodology is responsive to said torque command signal, said current value, and said velocity signal.

118. The storage medium of claim 115 wherein said feedback estimation methodology includes comparing said torque command signal with an estimated torque in a time coherent manner to generate a torque error.

119. The storage medium of claim 118 wherein said estimated torque is responsive to said current value, a velocity signal, and an earlier parameter estimate.

120. The storage medium of claim 119 wherein said earlier parameter estimate is an earlier motor constant estimate.

121. The storage medium of claim 118 wherein said feedback estimation methodology includes an error accumulator, which generates said parameter estimate in response to said torque error.

122. The storage medium of claim 121 wherein said error accumulator comprises a conditional integrator.

123. The storage medium of claim 121 wherein said error accumulator is initialized to a zero condition.

124. The storage medium of claim 121 wherein said error accumulator is initialized to a nominal value of said parameter.

125. The storage medium of claim 121 wherein said error accumulator is initialized to a saved value of said error accumulator, said saved value updated with a current output of said error accumulator only if said current output of said error accumulator exhibits a change in excess of a selected threshold.

126. The storage medium of claim 115 further comprising instructions for causing said controller to implement a method further comprising receiving an estimate good flag.

127. The storage medium of claim 126 wherein said estimate good flag is indicative of a validity of said estimated torque.

128. The storage medium of claim 115 further comprising instructions for causing said controller to implement a method further comprising receiving a rate flag.

129. The storage medium of claim 128 wherein said rate flag is indicative of current dynamics beyond a selected threshold.

130. The storage medium of claim 129 wherein said feedback estimation methodology is disabled when said rate flag indicates current dynamics beyond said selected threshold.

131. The storage medium of claim 112 wherein said temperature value is responsive to a temperature signal from a temperature sensor.

132. The storage medium of claim 131 further comprising instructions for causing said controller to implement a method further comprising linearizing said temperature signal.

133. The storage medium of claim 112 wherein said parameter estimation process includes a feedforward estimation methodology responsive to said temperature value and wherein said temperature value is responsive to a temperature estimation process.

134. The storage medium of claim 133 wherein said feedforward estimation methodology comprises compensation for temperature variations of said parameter, said compensation employing a temperature coefficient of said parameter.

135. The storage medium of claim 134 wherein said temperature estimation process further comprises at least one of:
   a silicon temperature estimate filter, responsive to said output from said temperature sensor, said silicon temperature estimate filter having an output corresponding to an estimated temperature of a switching device for said electric machine;
   a magnet temperature estimate filter, responsive to said output from said temperature sensor, said magnet temperature estimate filter having an output corresponding to an estimated temperature of a magnet associated with said electric machine; and
   a copper winding temperature estimate filter responsive to said output from said temperature sensor, said copper winding temperature estimate filter having an output corresponding to an estimated temperature of copper windings associated with said electric machine.

136. The storage medium of claim 133 further comprising instructions for causing said controller to implement a method further comprising initializing said temperature estimation process with an initialization signal.

137. The storage medium of claim 136 wherein said initialization signal initializes said temperature estimation process to a substrate temperature corresponding to a linearized output of said temperature sensor.

138. The storage medium of claim 136 wherein said initialization signal initializes said temperature estimation process by continuing to operate following power down until said temperature estimation process approaches an approximately steady state value.

139. The storage medium of claim 136 wherein said initialization signal is responsive to a computed duration of temperature change as a function of another temperature sensor.

140. The storage medium of claim 136 wherein said initialization signal initializes said temperature estimation process to an ambient temperature.

141. The storage medium of claim 136 wherein said initialization signal initializes said temperature estimation process to an ambient temperature estimate.

142. The storage medium of claim 136 wherein said temperature estimation process comprises at least one of:
   a silicon temperature estimate filter, responsive to said output from said temperature sensor, said silicon temperature estimate filter having an output corresponding to an estimated temperature of a switching device for said electric machine;
   a magnet temperature estimate filter, responsive to said output from said temperature sensor, said magnet temperature estimate filter having an output corresponding to an estimated temperature of a magnet associated with said electric machine; and
   a copper winding temperature estimate filter responsive to said output from said temperature sensor, said copper winding temperature estimate filter having an output corresponding to an estimated temperature of copper windings associated with said electric machine.

143. The storage medium of claim 134 further comprising instructions for causing said controller to implement a method further comprising initializing said parameter estimate with an initialization signal said initialization signal in communication with said temperature estimation process.

144. The storage medium of claim 112 wherein said parameter estimation process comprises a combination of a feedback estimation methodology and a feedforward estimation methodology.

145. The storage medium of claim 144 wherein said combination is responsive to at least one of said torque command signal, said current value, said temperature value, and a velocity signal.

146. The storage medium of claim 144 wherein said combination includes summing a parameter estimate correction from a feedback estimation methodology with a parameter estimate from a feedforward estimation methodology.

147. A computer data signal embodied in a carrier wave, the computer data signal comprising:
   code configured to cause a controller to implement a method for estimating a parameter of an electric machine comprising:
      receiving a torque command signal indicative of a desired torque for said electric machine;
      receiving a current value;
      receiving a temperature value; and
      wherein said estimating is a resultant of a parameter estimation process responsive to at least one of said torque command signal, said current value, and said temperature value, a resultant of said parameter estimation process representing said parameter of said electric machine.

148. The computer data signal of claim 147 wherein said parameter comprises at least one of a resistance, an inductance, and a motor constant.

149. The computer data signal of claim 147 wherein said current value is representative of a torque current for said electric machine.

150. The computer data signal of claim 147 wherein said parameter estimation process comprises a feedback estimation methodology.

151. The computer data signal of claim 150 wherein said feedback estimation methodology comprises a closed loop compensation for build and life variations in said parameter of said electric machine.

152. The computer data signal of claim 150 further including a velocity signal responsive to a velocity of said electric machine, wherein said feedback estimation methodology is responsive to said torque command signal, said current value, and said velocity signal.

153. The computer data signal of claim 150 wherein said feedback estimation methodology includes comparing said torque command signal with an estimated torque in a time coherent manner to generate a torque error.

154. The computer data signal of claim 153 wherein said estimated torque is responsive to said current value, a velocity signal, and an earlier parameter estimate.

155. The computer data signal of claim 154 wherein said earlier parameter estimate is an earlier motor constant estimate.

156. The computer data signal of claim 153 wherein said feedback estimation methodology includes an error accumulator, which generates said parameter estimate in response to said torque error.

157. The computer data signal of claim 156 wherein said error accumulator comprises a conditional integrator.

158. The computer data signal of claim 156 wherein said error accumulator is initialized to a zero condition.

159. The computer data signal of claim 156 wherein said error accumulator is initialized to a nominal value of said parameter.

160. The computer data signal of claim 156 wherein said error accumulator is initialized to a saved value of said error accumulator, said saved value updated with a current output of said error accumulator only if said current output of said error accumulator exhibits a change in excess of a selected threshold.

161. The computer data signal of claim 150 further comprising instructions for causing said controller to implement a method further comprising receiving an estimate good flag.

162. The computer data signal of claim 160 wherein said estimate good flag is indicative of a validity of said estimated torque.

163. The computer data signal of claim 150 further comprising instructions for causing said controller to implement a method further comprising receiving a rate flag.

164. The computer data signal of claim 163 wherein said rate flag is indicative of current dynamics beyond a selected threshold.

165. The computer data signal of claim 164 wherein said feedback estimation methodology is disabled when said rate flag indicates current dynamics beyond said selected threshold.

166. The computer data signal of claim 147 wherein said temperature value is responsive to a temperature signal from a temperature sensor.

167. The computer data signal of claim 166 further comprising instructions for causing said controller to implement a method further comprising linearizing said temperature signal.

168. The computer data signal of claim 147 wherein said parameter estimation process includes a feedforward estimation methodology responsive to said temperature value and wherein said temperature value is responsive to a temperature estimation process.

169. The computer data signal of claim 168 wherein said feedforward estimation methodology comprises compensation for temperature variations of said parameter, said compensation employing a temperature coefficient of said parameter.

170. The computer data signal of claim 169 wherein said temperature estimation process further comprises at least one of:

- a silicon temperature estimate filter, responsive to said output from said temperature sensor, said silicon temperature estimate filter having an output corresponding to an estimated temperature of a switching device for said electric machine;
- a magnet temperature estimate filter, responsive to said output from said temperature sensor, said magnet temperature estimate filter having an output corresponding to an estimated temperature of a magnet associated with said electric machine; and
- a copper winding temperature estimate filter responsive to said output from said temperature sensor, said copper winding temperature estimate filter having an output corresponding to an estimated temperature of copper windings associated with said electric machine.

171. The computer data signal of claim 168 further comprising instructions for causing said controller to implement a method further comprising initializing said temperature estimation process with an initialization signal.

172. The computer data signal of claim 171 wherein said initialization signal initializes said temperature estimation process to a substrate temperature corresponding to a linearized output of said temperature sensor.

173. The computer data signal of claim 171 wherein said initialization signal initializes said temperature estimation process by continuing to operate following power down until said temperature estimation process approaches an approximately steady state value.

174. The computer data signal of claim 171 wherein said initialization signal is responsive to a computed duration of temperature change as a function of another temperature sensor.

175. The computer data signal of claim 171 wherein said initialization signal initializes said temperature estimation process to an ambient temperature.

176. The computer data signal of claim 171 wherein said initialization signal initializes said temperature estimation process to an ambient temperature estimate.

177. The computer data signal of claim 171 wherein said temperature estimation process comprises at least one of:

- a silicon temperature estimate filter, responsive to said output from said temperature sensor, said silicon temperature estimate filter having an output corresponding to an estimated temperature of a switching device for said electric machine;
- a magnet temperature estimate filter, responsive to said output from said temperature sensor, said magnet temperature estimate filter having an output corresponding to an estimated temperature of a magnet associated with said electric machine; and
- a copper winding temperature estimate filter responsive to said output from said temperature sensor, said copper winding temperature estimate filter having an output corresponding to an estimated temperature of copper windings associated with said electric machine.

178. The computer data signal of claim 169 further comprising instructions for causing said controller to implement a method further comprising initializing said parameter estimate with an initialization signal said initialization signal in communication with said temperature estimation process.

179. The computer data signal of claim 147 wherein said parameter estimation process comprises a combination of a feedback estimation methodology and a feedforward estimation methodology.

180. The computer data signal of claim 179 wherein said combination is responsive to at least one of said torque command signal, said current value, a velocity signal, and said temperature value.

181. The computer data signal of claim 179 wherein said combination includes summing a parameter estimate correction from a feedback estimation methodology with a parameter estimate from a feedforward estimation methodology.

* * * * *